United States Patent
Brody et al.

(10) Patent No.: US 10,710,053 B2
(45) Date of Patent: *Jul. 14, 2020

(54) SELF-SUPPORTING STRUCTURES HAVING ACTIVE MATERIALS

(71) Applicant: ExxonMobil Upstream Research Company, Spring, TX (US)

(72) Inventors: John F. Brody, Bound Brook, NJ (US); Bradley Wooler, Quakertown, PA (US); Francesco J. Altera, Califon, NJ (US); Paul J. Tindall, Flemington, NJ (US); Yi Du, Coopersburg, PA (US)

(73) Assignee: ExxonMobil Upstream Research Company, Spring, TX (US)

( * ) Notice: Subject to any disclaimer, the term of this patent is extended or adjusted under 35 U.S.C. 154(b) by 101 days.

This patent is subject to a terminal disclaimer.

(21) Appl. No.: 15/826,269

(22) Filed: Nov. 29, 2017

(65) Prior Publication Data
US 2018/0169617 A1    Jun. 21, 2018

Related U.S. Application Data

(60) Provisional application No. 62/437,327, filed on Dec. 21, 2016, provisional application No. 62/585,574, filed on Nov. 14, 2017.

(51) Int. Cl.
*B01D 53/04* (2006.01)
*B01J 20/28* (2006.01)
(Continued)

(52) U.S. Cl.
CPC .... *B01J 20/28042* (2013.01); *B01D 46/2418* (2013.01); *B01D 53/047* (2013.01);
(Continued)

(58) Field of Classification Search
CPC .... B22F 2298/10; B22F 3/008; B22F 3/1121; B22F 3/1021; B22F 3/00; B22F 5/10;
(Continued)

(56) References Cited

U.S. PATENT DOCUMENTS 1,868,138 A    7/1932 Fisk
3,103,425 A    9/1963 Meyer
(Continued)

FOREIGN PATENT DOCUMENTS

CA    2297590    9/2000
CA    2237103    12/2001
(Continued)

OTHER PUBLICATIONS

Patcas, F. C. et al. (2007) "CO Oxidation over Structured Carriers: A Comparison of Ceramic Forms, Honeycombs and Beads," *Chem. Engineering Science*, v. 62, pp. 3984-3990.
(Continued)

*Primary Examiner* — Frank M Lawrence, Jr.
(74) *Attorney, Agent, or Firm* — ExxonMobil Upstream Research Company, Law Department

(57) ABSTRACT

A method and system for manufacturing and using a self-supporting structure in processing unit for adsorption or catalytic processes. The self-supporting structure has greater than 50% by weight of the active material in the self-supporting structure to provide an open-celled structure providing access to the active material. The self-supporting structures, which may be disposed in a processing unit, may be used in swing adsorption processes and other processes to enhance the recovery of hydrocarbons.

9 Claims, 11 Drawing Sheets

(51) Int. Cl.

| | | |
|---|---|---|
| *B01D 53/26* | (2006.01) | |
| *B01J 20/30* | (2006.01) | |
| *B01J 35/04* | (2006.01) | |
| *B01J 37/00* | (2006.01) | |
| *B01J 37/08* | (2006.01) | |
| *B01D 53/047* | (2006.01) | |
| *B01D 46/24* | (2006.01) | |
| *C04B 38/00* | (2006.01) | |
| *B33Y 80/00* | (2015.01) | |
| *C04B 35/18* | (2006.01) | |
| *B01J 20/18* | (2006.01) | |
| *B28B 7/18* | (2006.01) | |
| *B33Y 10/00* | (2015.01) | |
| *B22F 3/00* | (2006.01) | |
| *B28B 7/34* | (2006.01) | |
| *B22F 3/11* | (2006.01) | |
| *B22F 5/10* | (2006.01) | |
| *C04B 35/195* | (2006.01) | |
| *C04B 38/06* | (2006.01) | |
| *C04B 35/19* | (2006.01) | |
| *B01D 46/00* | (2006.01) | |
| *B33Y 40/00* | (2020.01) | |
| *C04B 111/00* | (2006.01) | |
| *B29C 64/106* | (2017.01) | |

(52) U.S. Cl.
CPC ..... *B01D 53/0446* (2013.01); *B01D 53/0462* (2013.01); *B01D 53/0473* (2013.01); *B01D 53/261* (2013.01); *B01J 20/183* (2013.01); *B01J 20/2803* (2013.01); *B01J 20/28045* (2013.01); *B01J 20/28052* (2013.01); *B01J 20/3007* (2013.01); *B01J 20/3057* (2013.01); *B01J 20/3064* (2013.01); *B01J 20/3078* (2013.01); *B01J 35/04* (2013.01); *B01J 37/0009* (2013.01); *B01J 37/0018* (2013.01); *B01J 37/08* (2013.01); *B22F 3/00* (2013.01); *B22F 3/008* (2013.01); *B22F 3/1121* (2013.01); *B22F 5/10* (2013.01); *B28B 7/18* (2013.01); *B28B 7/342* (2013.01); *B28B 7/346* (2013.01); *B28B 7/348* (2013.01); *B33Y 10/00* (2014.12); *B33Y 80/00* (2014.12); *C04B 35/18* (2013.01); *C04B 35/19* (2013.01); *C04B 35/195* (2013.01); *C04B 38/0006* (2013.01); *C04B 38/0655* (2013.01); *B01D 46/0001* (2013.01); *B01D 2253/108* (2013.01); *B01D 2253/34* (2013.01); *B01D 2253/3425* (2013.01); *B01D 2256/24* (2013.01); *B01D 2257/504* (2013.01); *B01D 2257/80* (2013.01); *B01D 2259/40003* (2013.01); *B01D 2259/40043* (2013.01); *B01D 2259/4062* (2013.01); *B22F 2998/10* (2013.01); *B29C 64/106* (2017.08); *B33Y 40/00* (2014.12); *C04B 2111/0081* (2013.01); *Y02C 10/08* (2013.01)

(58) Field of Classification Search
CPC ....... B22F 1/0074; C04B 35/18; C04B 35/19; C04B 35/195; C04B 38/0655; C04B 38/0064; C04B 38/0006; C04B 2111/0081; Y02C 10/08; B01D 46/0001; B01D 46/2418; B01D 53/0446; B01D 53/0462; B01D 53/047; B01D 53/0473; B01D 53/261; B01D 2253/108; B01D 2253/34; B01D 2253/3425; B01D 2256/24; B01D 2257/504; B01D 2257/80; B01D 2259/40003; B01D 2259/40043; B01D 2259/4062; B29C 64/106; B01J 20/183; B01J 20/2803; B01J 20/28042; B01J 20/28045; B01J 20/28052; B01J 20/3007; B01J 20/3057; B01J 20/3064; B01J 20/3078; B01J 35/04; B01J 37/0009; B01J 37/0018; B01J 37/08; B33Y 10/00; B33Y 40/00; B33Y 80/00
USPC .......................... 96/121, 153, 154, 152, 139
See application file for complete search history.

(56) References Cited

U.S. PATENT DOCUMENTS

| | | |
|---|---|---|
| 3,124,152 A | 3/1964 | Payne |
| 3,142,547 A | 7/1964 | Marsh et al. |
| 3,508,758 A | 4/1970 | Strub |
| 3,602,247 A | 8/1971 | Bunn et al. |
| 3,788,036 A | 1/1974 | Lee et al. |
| 3,967,464 A | 7/1976 | Cormier et al. |
| 4,187,092 A | 2/1980 | Woolley |
| 4,261,815 A | 4/1981 | Kelland |
| 4,324,565 A | 4/1982 | Benkmann |
| 4,325,565 A | 4/1982 | Winchell |
| 4,329,162 A | 5/1982 | Pitcher |
| 4,340,398 A | 7/1982 | Doshi et al. |
| 4,386,947 A * | 6/1983 | Mizuno .................. B01D 53/02 123/519 |
| 4,445,441 A | 5/1984 | Tanca |
| 4,461,630 A | 7/1984 | Cassidy et al. |
| 4,496,376 A | 1/1985 | Hradek |
| 4,705,627 A | 11/1987 | Miwa et al. |
| 4,711,968 A | 12/1987 | Oswald et al. |
| 4,737,170 A | 4/1988 | Searle |
| 4,770,676 A | 9/1988 | Sircar et al. |
| 4,783,205 A | 11/1988 | Searle |
| 4,784,672 A | 11/1988 | Sircar |
| 4,790,272 A | 12/1988 | Woolenweber |
| 4,814,146 A | 3/1989 | Brand et al. |
| 4,816,039 A | 3/1989 | Krishnamurthy et al. |
| 4,877,429 A | 10/1989 | Hunter |
| 4,977,745 A | 12/1990 | Heichberger |
| 5,110,328 A | 5/1992 | Yokota et al. |
| 5,125,934 A | 6/1992 | Krishnamurthy et al. |
| 5,169,006 A | 12/1992 | Stelzer |
| 5,174,796 A | 12/1992 | Davis et al. |
| 5,224,350 A | 7/1993 | Mehra |
| 5,234,472 A | 8/1993 | Krishnamurthy et al. |
| 5,292,990 A | 3/1994 | Kantner et al. |
| 5,306,331 A | 4/1994 | Auvil et al. |
| 5,332,426 A * | 7/1994 | Tang ....................... B60H 3/06 55/385.3 |
| 5,354,346 A | 10/1994 | Kumar |
| 5,365,011 A | 11/1994 | Ramachandran et al. |
| 5,370,728 A | 12/1994 | LaSala et al. |
| 5,486,227 A | 1/1996 | Kumar et al. |
| 5,547,641 A | 8/1996 | Smith et al. |
| 5,547,648 A * | 8/1996 | Buchanan .............. B01D 53/04 423/210 |
| 5,565,018 A | 10/1996 | Baksh et al. |
| 5,672,196 A | 9/1997 | Acharya et al. |
| 5,700,310 A | 12/1997 | Bowman et al. |
| 5,733,451 A | 3/1998 | Coellner et al. |
| 5,735,938 A | 4/1998 | Baksh et al. |
| 5,750,026 A | 5/1998 | Gadkaree et al. |
| 5,769,928 A | 6/1998 | Leavitt |
| 5,792,239 A | 8/1998 | Reinhold, III et al. |
| 5,807,423 A | 9/1998 | Lemcoff et al. |
| 5,811,616 A | 9/1998 | Holub et al. |
| 5,827,358 A | 10/1998 | Kulish et al. |
| 5,906,673 A | 5/1999 | Reinhold, III et al. |
| 5,912,426 A | 6/1999 | Smolarek et al. |
| 5,914,294 A | 6/1999 | Park et al. |
| 5,924,307 A | 7/1999 | Nenov |
| 5,935,444 A | 8/1999 | Johnson et al. |
| 5,968,234 A | 10/1999 | Midgett, II et al. |
| 5,976,221 A | 11/1999 | Bowman et al. |

(56) References Cited

U.S. PATENT DOCUMENTS

| | | |
|---|---|---|
| 5,997,617 A | 12/1999 | Czabala et al. |
| 6,007,606 A | 12/1999 | Baksh et al. |
| 6,011,192 A | 1/2000 | Baker et al. |
| 6,023,942 A | 2/2000 | Thomas et al. |
| 6,053,966 A | 4/2000 | Moreau et al. |
| 6,063,161 A | 5/2000 | Keefer et al. |
| 6,096,115 A | 8/2000 | Kleinberg |
| 6,099,621 A | 8/2000 | Ho |
| 6,129,780 A | 10/2000 | Millet et al. |
| 6,136,222 A | 10/2000 | Friesen et al. |
| 6,147,126 A | 11/2000 | DeGeorge et al. |
| 6,152,991 A | 11/2000 | Ackley |
| 6,156,101 A | 12/2000 | Naheiri |
| 6,171,371 B1 | 1/2001 | Derive et al. |
| 6,176,897 B1 | 1/2001 | Keefer |
| 6,179,900 B1 | 1/2001 | Behling et al. |
| 6,183,538 B1 | 2/2001 | Naheiri |
| 6,194,079 B1 | 2/2001 | Hekal |
| 6,210,466 B1 | 4/2001 | Whysall et al. |
| 6,231,302 B1 | 5/2001 | Bonardi |
| 6,245,127 B1 | 6/2001 | Kane et al. |
| 6,284,021 B1 | 9/2001 | Lu et al. |
| 6,311,719 B1 | 11/2001 | Hill et al. |
| 6,345,954 B1 | 2/2002 | Al-Himyary et al. |
| 6,398,853 B1 | 6/2002 | Keefer et al. |
| 6,402,813 B2 | 6/2002 | Monereau et al. |
| 6,406,523 B1 | 6/2002 | Connor et al. |
| 6,413,303 B2 * | 7/2002 | Gelderland ............ B01D 39/18 162/145 |
| 6,425,938 B1 | 7/2002 | Xu et al. |
| 6,432,379 B1 | 8/2002 | Heung |
| 6,436,171 B1 | 8/2002 | Wang et al. |
| 6,444,012 B1 | 9/2002 | Dolan et al. |
| 6,444,014 B1 | 9/2002 | Mullhaupt et al. |
| 6,444,523 B1 | 9/2002 | Fan et al. |
| 6,451,095 B1 | 9/2002 | Keefer et al. |
| 6,457,485 B2 | 10/2002 | Hill et al. |
| 6,471,939 B1 | 10/2002 | Boix et al. |
| 6,488,747 B1 | 12/2002 | Keefer |
| 6,497,750 B2 | 12/2002 | Butwell et al. |
| 6,500,234 B1 | 12/2002 | Ackley et al. |
| 6,500,241 B2 | 12/2002 | Reddy |
| 6,500,404 B1 | 12/2002 | Camblor Fernandez et al. |
| 6,503,299 B2 | 1/2003 | Baksh et al. |
| 6,506,351 B1 | 1/2003 | Jain et al. |
| 6,514,318 B2 | 2/2003 | Keefer |
| 6,514,319 B2 | 2/2003 | Keefer et al. |
| 6,517,609 B1 | 2/2003 | Monereau et al. |
| 6,531,516 B2 | 3/2003 | Davis et al. |
| 6,533,846 B1 | 3/2003 | Keefer et al. |
| 6,565,627 B1 * | 5/2003 | Golden .............. B01D 53/0473 95/100 |
| 6,565,635 B2 | 5/2003 | Keefer et al. |
| 6,565,825 B2 | 5/2003 | Ohji et al. |
| 6,572,678 B1 | 6/2003 | Wijmans et al. |
| 6,579,341 B2 | 6/2003 | Baker et al. |
| 6,593,541 B1 | 7/2003 | Herren |
| 6,595,233 B2 | 7/2003 | Pulli |
| 6,605,136 B1 | 8/2003 | Graham et al. |
| 6,607,584 B2 | 8/2003 | Moreau et al. |
| 6,630,012 B2 | 10/2003 | Wegeng et al. |
| 6,631,626 B1 | 10/2003 | Hahn |
| 6,641,645 B1 | 11/2003 | Lee et al. |
| 6,651,645 B1 | 11/2003 | Nunez Suarez |
| 6,660,064 B2 | 12/2003 | Golden et al. |
| 6,660,065 B2 | 12/2003 | Byrd et al. |
| 6,692,626 B2 | 2/2004 | Keefer et al. |
| 6,712,087 B2 | 3/2004 | Hill et al. |
| 6,742,507 B2 | 6/2004 | Keefer et al. |
| 6,746,515 B2 | 6/2004 | Wegeng et al. |
| 6,752,852 B1 | 6/2004 | Jacksier et al. |
| 6,770,120 B2 | 8/2004 | Neu et al. |
| 6,773,225 B2 | 8/2004 | Yuri et al. |
| 6,802,889 B2 | 10/2004 | Graham et al. |
| 6,814,771 B2 | 11/2004 | Scardino et al. |
| 6,835,354 B2 | 12/2004 | Woods et al. |
| 6,840,985 B2 | 1/2005 | Keefer |
| 6,866,950 B2 | 3/2005 | Connor et al. |
| 6,889,710 B2 | 5/2005 | Wagner |
| 6,890,376 B2 | 5/2005 | Arquin et al. |
| 6,893,483 B2 | 5/2005 | Golden et al. |
| 6,902,602 B2 | 6/2005 | Keefer et al. |
| 6,916,358 B2 | 7/2005 | Nakamura et al. |
| 6,918,953 B2 | 7/2005 | Lomax, Jr. et al. |
| 6,921,597 B2 | 7/2005 | Keefer et al. |
| 6,974,496 B2 | 12/2005 | Wegeng et al. |
| 7,025,801 B2 | 4/2006 | Monereau |
| 7,027,929 B2 | 4/2006 | Wang |
| 7,029,521 B2 | 4/2006 | Johansson |
| 7,074,323 B2 | 7/2006 | Ghijsen |
| 7,077,891 B2 | 7/2006 | Jaffe et al. |
| 7,087,331 B2 | 8/2006 | Keefer et al. |
| 7,094,275 B2 | 8/2006 | Keefer et al. |
| 7,097,925 B2 | 8/2006 | Keefer et al. |
| 7,112,239 B2 | 9/2006 | Kimbara et al. |
| 7,117,669 B2 | 10/2006 | Kaboord et al. |
| 7,122,073 B1 | 10/2006 | Notaro et al. |
| 7,128,775 B2 | 10/2006 | Celik et al. |
| 7,144,016 B2 | 12/2006 | Gozdawa |
| 7,160,356 B2 | 1/2007 | Koros et al. |
| 7,160,367 B2 | 1/2007 | Babicki et al. |
| 7,166,149 B2 | 1/2007 | Dunne et al. |
| 7,172,645 B1 | 2/2007 | Pfister et al. |
| 7,189,280 B2 | 3/2007 | Alizadeh-Khiavi et al. |
| 7,250,073 B2 | 7/2007 | Keefer et al. |
| 7,250,074 B2 | 7/2007 | Tonkovich et al. |
| 7,255,727 B2 | 8/2007 | Monereau et al. |
| 7,258,725 B2 | 8/2007 | Ohmi et al. |
| 7,276,107 B2 | 10/2007 | Baksh et al. |
| 7,279,029 B2 | 10/2007 | Occhialini et al. |
| 7,285,350 B2 | 10/2007 | Keefer et al. |
| 7,297,279 B2 | 11/2007 | Johnson et al. |
| 7,311,763 B2 | 12/2007 | Neary |
| RE40,006 E | 1/2008 | Keefer et al. |
| 7,314,503 B2 | 1/2008 | Landrum et al. |
| 7,354,562 B2 | 4/2008 | Ying et al. |
| 7,387,849 B2 | 6/2008 | Keefer et al. |
| 7,390,350 B2 | 6/2008 | Weist, Jr. et al. |
| 7,404,846 B2 | 7/2008 | Golden et al. |
| 7,438,079 B2 | 10/2008 | Cohen et al. |
| 7,449,049 B2 | 11/2008 | Thomas et al. |
| 7,456,131 B2 | 11/2008 | Klett et al. |
| 7,510,601 B2 | 3/2009 | Whitley et al. |
| 7,527,670 B2 | 5/2009 | Ackley et al. |
| 7,553,568 B2 | 6/2009 | Keefer |
| 7,578,864 B2 | 8/2009 | Watanabe et al. |
| 7,604,682 B2 | 10/2009 | Seaton |
| 7,637,989 B2 | 12/2009 | Bong |
| 7,641,716 B2 | 1/2010 | Lomax, Jr. et al. |
| 7,645,324 B2 | 1/2010 | Rode et al. |
| 7,651,549 B2 | 1/2010 | Whitley |
| 7,674,319 B2 | 3/2010 | Lomax, Jr. et al. |
| 7,674,539 B2 | 3/2010 | Keefer et al. |
| 7,687,044 B2 | 3/2010 | Keefer et al. |
| 7,713,333 B2 | 5/2010 | Rege et al. |
| 7,717,981 B2 | 5/2010 | LaBuda et al. |
| 7,722,700 B2 | 5/2010 | Sprinkle |
| 7,731,782 B2 | 6/2010 | Kelley et al. |
| 7,740,687 B2 | 6/2010 | Reinhold, III |
| 7,744,676 B2 | 6/2010 | Leitmayr et al. |
| 7,744,677 B2 | 6/2010 | Barclay et al. |
| 7,758,051 B2 | 7/2010 | Roberts-Haritonov et al. |
| 7,758,988 B2 | 7/2010 | Keefer et al. |
| 7,763,098 B2 | 7/2010 | Alizadeh-Khiavi et al. |
| 7,763,099 B2 | 7/2010 | Verma et al. |
| 7,792,983 B2 | 9/2010 | Mishra et al. |
| 7,793,675 B2 | 9/2010 | Cohen et al. |
| 7,806,965 B2 | 10/2010 | Stinson |
| 7,819,948 B2 | 10/2010 | Wagner |
| 7,828,877 B2 | 11/2010 | Sawada et al. |
| 7,828,880 B2 | 11/2010 | Moriya et al. |
| 7,854,793 B2 | 12/2010 | Rarig et al. |
| 7,858,169 B2 | 12/2010 | Yamashita |
| 7,862,645 B2 | 1/2011 | Whitley et al. |

(56) References Cited

U.S. PATENT DOCUMENTS

| | | | |
|---|---|---|---|
| 7,867,320 B2 | 1/2011 | Baksh et al. |
| 7,902,114 B2 | 3/2011 | Bowie et al. |
| 7,938,886 B2 | 5/2011 | Hershkowitz et al. |
| 7,947,118 B2 | 5/2011 | Rarig et al. |
| 7,947,120 B2 | 5/2011 | Deckman et al. |
| 7,959,720 B2 | 6/2011 | Deckman et al. |
| 8,016,918 B2 | 9/2011 | LaBuda et al. |
| 8,034,164 B2 | 10/2011 | Lomax, Jr. et al. |
| 8,071,063 B2 | 12/2011 | Reyes et al. |
| 8,128,734 B2 | 3/2012 | Song |
| 8,142,745 B2 | 3/2012 | Reyes et al. |
| 8,142,746 B2 | 3/2012 | Reyes et al. |
| 8,192,709 B2 | 6/2012 | Reyes et al. |
| 8,210,772 B2 | 7/2012 | Gillecriosd |
| 8,227,121 B2 | 7/2012 | Adams et al. |
| 8,262,773 B2 | 9/2012 | Northrop et al. |
| 8,262,783 B2 | 9/2012 | Stoner et al. |
| 8,268,043 B2 | 9/2012 | Celik et al. |
| 8,268,044 B2 | 9/2012 | Wright et al. |
| 8,272,401 B2 | 9/2012 | McLean |
| 8,287,629 B2 | 10/2012 | Fujita et al. |
| 8,319,090 B2 | 11/2012 | Kitamura |
| 8,337,594 B2 | 12/2012 | Corma Canos et al. |
| 8,361,200 B2 | 1/2013 | Sayari et al. |
| 8,361,205 B2 | 1/2013 | Desai et al. |
| 8,377,173 B2 | 2/2013 | Chuang |
| 8,444,750 B2 | 5/2013 | Deckman et al. |
| 8,470,395 B2 | 6/2013 | Khiavi et al. |
| 8,480,795 B2 | 7/2013 | Siskin et al. |
| 8,512,569 B2 | 8/2013 | Eaton et al. |
| 8,518,356 B2 | 8/2013 | Schaffer et al. |
| 8,529,662 B2 | 9/2013 | Kelley et al. |
| 8,529,663 B2 | 9/2013 | Reyes et al. |
| 8,529,664 B2 | 9/2013 | Deckman et al. |
| 8,529,665 B2 | 9/2013 | Manning et al. |
| 8,535,414 B2 | 9/2013 | Johnson et al. |
| 8,545,602 B2 | 10/2013 | Chance et al. |
| 8,551,444 B2 | 10/2013 | Agnihotri et al. |
| 8,573,124 B2 | 11/2013 | Havran et al. |
| 8,591,627 B2 | 11/2013 | Jain |
| 8,591,634 B2 | 11/2013 | Winchester et al. |
| 8,616,233 B2 | 12/2013 | McLean et al. |
| 8,657,922 B2 | 2/2014 | Yamawaki et al. |
| 8,673,059 B2 | 3/2014 | Leta et al. |
| 8,680,344 B2 | 3/2014 | Weston et al. |
| 8,715,617 B2 | 5/2014 | Genkin et al. |
| 8,752,390 B2 | 6/2014 | Wright et al. |
| 8,778,051 B2 | 7/2014 | Weist, Jr. et al. |
| 8,784,533 B2 | 7/2014 | Leta et al. |
| 8,784,534 B2 | 7/2014 | Kamakoti et al. |
| 8,784,535 B2 | 7/2014 | Ravikovitch et al. |
| 8,795,411 B2 | 8/2014 | Hufton et al. |
| 8,808,425 B2 | 8/2014 | Genkin et al. |
| 8,808,426 B2 | 8/2014 | Sundaram |
| 8,814,985 B2 | 8/2014 | Gerds et al. |
| 8,852,322 B2 | 10/2014 | Gupta et al. |
| 8,858,683 B2 | 10/2014 | Deckman |
| 8,875,483 B2 | 11/2014 | Wettstein |
| 8,906,138 B2 | 12/2014 | Rasmussen et al. |
| 8,921,637 B2 | 12/2014 | Sundaram et al. |
| 8,939,014 B2 | 1/2015 | Kamakoti et al. |
| 9,005,561 B2 | 4/2015 | Leta |
| 9,017,457 B2 | 4/2015 | Tammera |
| 9,028,595 B2 | 5/2015 | Sundaram et al. |
| 9,034,078 B2 | 5/2015 | Wanni et al. |
| 9,034,079 B2 | 5/2015 | Deckman et al. |
| 9,050,553 B2 | 6/2015 | Alizadeh-Khiavi et al. |
| 9,067,168 B2 | 6/2015 | Frederick et al. |
| 9,095,809 B2 | 8/2015 | Deckman et al. |
| 9,108,145 B2 | 8/2015 | Kalbassi et al. |
| 9,120,049 B2 | 9/2015 | Sundaram et al. |
| 9,126,138 B2 | 9/2015 | Deckman et al. |
| 9,162,175 B2 | 10/2015 | Sundaram |
| 9,168,485 B2 | 10/2015 | Deckman et al. |
| 2001/0047824 A1 | 12/2001 | Hill et al. |
| 2002/0053547 A1 | 5/2002 | Schlegel et al. |
| 2002/0124885 A1 | 9/2002 | Hill et al. |
| 2002/0162452 A1 | 11/2002 | Butwell et al. |
| 2003/0041733 A1* | 3/2003 | Seguin .............. B01D 53/02 96/108 |
| 2003/0075485 A1 | 4/2003 | Ghijsen |
| 2003/0129101 A1 | 7/2003 | Zettel |
| 2003/0131728 A1 | 7/2003 | Kanazirev et al. |
| 2003/0145726 A1 | 8/2003 | Gueret .............. 95/96 |
| 2003/0170527 A1 | 9/2003 | Finn et al. |
| 2003/0202918 A1 | 10/2003 | Ashida et al. |
| 2003/0205130 A1 | 11/2003 | Neu et al. |
| 2003/0223856 A1 | 12/2003 | Yuri et al. |
| 2004/0099142 A1 | 5/2004 | Arquin et al. |
| 2004/0118277 A1 | 6/2004 | Kim |
| 2004/0118287 A1* | 6/2004 | Jaffe .............. B01D 53/0423 96/121 |
| 2004/0197596 A1 | 10/2004 | Connor et al. |
| 2004/0232622 A1 | 11/2004 | Gozdawa |
| 2005/0109419 A1 | 5/2005 | Ohmi et al. |
| 2005/0114032 A1 | 5/2005 | Wang |
| 2005/0129952 A1 | 6/2005 | Sawada et al. |
| 2005/0014511 A1 | 7/2005 | Keefer et al. |
| 2005/0145111 A1 | 7/2005 | Keefer et al. |
| 2005/0150378 A1 | 7/2005 | Dunne et al. |
| 2005/0229782 A1 | 10/2005 | Monereau et al. |
| 2005/0252378 A1 | 11/2005 | Celik et al. |
| 2006/0017940 A1 | 1/2006 | Takayama |
| 2006/0048648 A1 | 3/2006 | Gibbs et al. |
| 2006/0049102 A1 | 3/2006 | Miller et al. |
| 2006/0076270 A1 | 4/2006 | Poshusta et al. |
| 2006/0099096 A1 | 5/2006 | Shaffer et al. |
| 2006/0105158 A1 | 5/2006 | Fritz et al. |
| 2006/0162556 A1 | 7/2006 | Ackley et al. |
| 2006/0165574 A1 | 7/2006 | Sayari |
| 2006/0169140 A1* | 8/2006 | Lomax, Jr. .......... B01D 53/047 95/96 |
| 2006/0169142 A1 | 8/2006 | Rode et al. |
| 2006/0236862 A1 | 10/2006 | Golden et al. |
| 2007/0084241 A1 | 4/2007 | Kretchmer et al. |
| 2007/0084344 A1 | 4/2007 | Moriya et al. |
| 2007/0222160 A1 | 9/2007 | Roberts-Haritonov et al. |
| 2007/0253872 A1 | 11/2007 | Keefer et al. |
| 2007/0261550 A1 | 11/2007 | Ota |
| 2007/0261557 A1 | 11/2007 | Gadkaree et al. |
| 2007/0283807 A1 | 12/2007 | Whitley |
| 2008/0051279 A1 | 2/2008 | Klett et al. |
| 2008/0072822 A1 | 3/2008 | White |
| 2008/0128655 A1 | 6/2008 | Garg et al. |
| 2008/0282883 A1 | 11/2008 | Rarig et al. |
| 2008/0282884 A1 | 11/2008 | Kelley et al. .............. 95/96 |
| 2008/0282885 A1 | 11/2008 | Deckman et al. .............. 95/98 |
| 2008/0282886 A1 | 11/2008 | Reyes et al. .............. 95/98 |
| 2008/0282887 A1 | 11/2008 | Chance .............. 95/98 |
| 2008/0282892 A1 | 11/2008 | Deckman et al. .............. 96/140 |
| 2008/0289497 A1 | 11/2008 | Barclay et al. |
| 2008/0307966 A1 | 12/2008 | Stinson |
| 2008/0314550 A1 | 12/2008 | Greco |
| 2009/0004073 A1 | 1/2009 | Gleize et al. |
| 2009/0014902 A1 | 1/2009 | Koivunen et al. |
| 2009/0025553 A1 | 1/2009 | Keefer et al. |
| 2009/0025555 A1 | 1/2009 | Lively et al. |
| 2009/0037550 A1 | 2/2009 | Mishra et al. |
| 2009/0071333 A1 | 3/2009 | LaBuda et al. |
| 2009/0079870 A1 | 3/2009 | Matsui |
| 2009/0107332 A1 | 4/2009 | Wagner |
| 2009/0151559 A1 | 6/2009 | Verma et al. |
| 2009/0162268 A1 | 6/2009 | Hufton et al. |
| 2009/0180423 A1 | 7/2009 | Kroener |
| 2009/0241771 A1 | 10/2009 | Manning et al. |
| 2009/0284013 A1 | 11/2009 | Anand et al. |
| 2009/0294366 A1 | 12/2009 | Wright et al. |
| 2009/0308248 A1 | 12/2009 | Siskin et al. |
| 2009/0314159 A1 | 12/2009 | Haggerty |
| 2010/0059701 A1 | 3/2010 | McLean |
| 2010/0077920 A1 | 4/2010 | Baksh et al. |
| 2010/0089241 A1 | 4/2010 | Stoner et al. |
| 2010/0186445 A1 | 7/2010 | Minta et al. |
| 2010/0212493 A1 | 8/2010 | Rasmussen et al. |

(56) References Cited

U.S. PATENT DOCUMENTS

| | | |
|---|---|---|
| 2010/0251887 A1 | 10/2010 | Jain |
| 2010/0252497 A1 | 10/2010 | Ellison et al. |
| 2010/0263534 A1 | 10/2010 | Chuang |
| 2010/0282593 A1 | 11/2010 | Speirs et al. |
| 2010/0288704 A1 | 11/2010 | Amsden et al. |
| 2011/0011803 A1 | 1/2011 | Koros |
| 2011/0020202 A1 | 1/2011 | Gadkaree et al. |
| 2011/0031103 A1 | 2/2011 | Deckman et al. |
| 2011/0067440 A1 | 3/2011 | Van Aken |
| 2011/0067770 A1 | 3/2011 | Pederson et al. |
| 2011/0146494 A1 | 6/2011 | Desai et al. |
| 2011/0217218 A1 | 9/2011 | Gupta et al. |
| 2011/0277620 A1 | 11/2011 | Havran et al. |
| 2011/0291051 A1 | 12/2011 | Hershkowitz et al. |
| 2011/0296871 A1 | 12/2011 | Van Soest-Vercammen et al. |
| 2011/0308524 A1 | 12/2011 | Brey et al. |
| 2012/0024152 A1 | 2/2012 | Yamawaki et al. |
| 2012/0031144 A1 | 2/2012 | Northrop et al. |
| 2012/0067216 A1 | 3/2012 | Corma-Canos et al. |
| 2012/0152115 A1 | 6/2012 | Gerds et al. |
| 2012/0222551 A1 | 9/2012 | Deckman |
| 2012/0222552 A1 | 9/2012 | Ravikovitch et al. |
| 2012/0222553 A1 | 9/2012 | Kamakoti et al. |
| 2012/0222554 A1 | 9/2012 | Leta et al. |
| 2012/0222555 A1 | 9/2012 | Gupta et al. |
| 2012/0255377 A1 | 10/2012 | Kamakoti et al. |
| 2012/0308456 A1 | 12/2012 | Leta et al. |
| 2012/0312163 A1 | 12/2012 | Leta et al. |
| 2013/0061755 A1 | 3/2013 | Frederick et al. |
| 2013/0225898 A1 | 8/2013 | Sundaram et al. |
| 2013/0276634 A1* | 10/2013 | McKenna ............ B01D 53/047 96/153 |
| 2013/0312605 A1* | 11/2013 | Hufen ................ B01D 53/0407 95/90 |
| 2014/0013955 A1 | 1/2014 | Tammera et al. .......... 96/115 |
| 2014/0026750 A1* | 1/2014 | Jain .................. B01D 53/04 95/96 |
| 2014/0060326 A1 | 3/2014 | Sundaram et al. |
| 2014/0157986 A1 | 6/2014 | Ravikovitch et al. |
| 2014/0208797 A1 | 7/2014 | Kelley et al. |
| 2014/0216254 A1 | 8/2014 | Tammera et al. |
| 2015/0013377 A1 | 1/2015 | Oelfke |
| 2015/0068397 A1 | 3/2015 | Boulet et al. |
| 2015/0101483 A1* | 4/2015 | Perry .................. B01J 20/2803 95/148 |
| 2015/0196870 A1 | 7/2015 | Albright et al. |
| 2015/0328578 A1 | 11/2015 | Deckman et al. |
| 2016/0023155 A1 | 1/2016 | Ramkumar et al. |
| 2016/0096137 A1* | 4/2016 | House .................. B01D 53/04 95/134 |
| 2016/0129433 A1 | 5/2016 | Tammera et al. |
| 2016/0166972 A1 | 6/2016 | Owens et al. |
| 2016/0236135 A1 | 8/2016 | Tammera et al. |
| 2016/0332105 A1 | 11/2016 | Tammera et al. |
| 2016/0332106 A1 | 11/2016 | Tammera et al. |
| 2017/0056810 A1 | 3/2017 | Johnson et al. ..... B01D 53/047 |
| 2017/0056813 A1 | 3/2017 | McMahon et al. ........... B01D 53/0462 |
| 2017/0056814 A1 | 3/2017 | Marshall et al. .. B01D 53/0462 |
| 2017/0056815 A1 | 3/2017 | Nagavarapu et al. ........ B01D 53/0473 |
| 2017/0113173 A1 | 4/2017 | Fowler et al. |
| 2017/0113175 A1 | 4/2017 | Fowler et al. |
| 2017/0113176 A1 | 4/2017 | Fowler et al. |
| 2017/0136405 A1 | 5/2017 | Ravikovitch et al. |
| 2017/0266604 A1 | 9/2017 | Tammera et al. |
| 2018/0169565 A1* | 6/2018 | Brody .................. B01D 53/02 |

FOREIGN PATENT DOCUMENTS

| | | |
|---|---|---|
| EP | 0225736 | 6/1987 |
| EP | 0257493 | 2/1988 |
| EP | 0262934 | 4/1988 |
| EP | 0426937 | 5/1991 |
| EP | 1018359 | 7/2000 |
| EP | 1045728 | 11/2000 |
| EP | 1577561 | 9/2005 |
| EP | 1674555 | 6/2006 |
| EP | 2823872 | 1/2015 |
| FR | 2924951 | 6/2009 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 2011-169640 | 6/1999 |
| JP | 2011-280921 | 10/1999 |
| JP | 2000-024445 | 8/2001 |
| JP | 2002-348651 | 12/2002 |
| JP | 2006-016470 | 1/2006 |
| JP | 2006-036849 | 2/2006 |
| JP | 2008-272534 | 11/2008 |
| WO | WO2002/024309 | 3/2002 |
| WO | WO2002/073728 | 9/2002 |
| WO | WO2005/090793 | 9/2005 |
| WO | WO2011/139894 | 11/2011 |
| WO | WO2012/032325 | 3/2012 |

OTHER PUBLICATIONS

Rezaei, F. et al. (2009) "Optimum Structured Adsorbents for Gas Separation Process," *Chem. Engineering Science*, v. 64, pp. 5182-5191.

Richardson, J. T. et al. (2000) "Properties of Ceramic Foam Catalyst Supports: Pressure Drop," *Applied Catalysis A: General* v. 204, pp. 19-32.

Stemmet, C. P. et al. (2006) "Solid Foam Packings for Multiphase Reactors: Modelling of Liquid Holdup and Mass Transfer," *Chem. Engineering Research and Design*, v. 84(A12), pp. 1134-1141.

ExxonMobil Research and Engineering and QuestAir (2008) "A New Commercialized Process for Lower Cost H2 Recovery—Rapid Cycle Pressure Swing Adsorption (RCPSA)," *Brochure*, 4 pgs.

Farooq, S. et al. (1990) "Continuous Countercurrent Flow Model for a Bulk PSA Separation Process," *AIChE J.*, v36 (2) p. 310-314.

FlowServe (2005)"Exceeding Expectations, US Navy Cuts Maintenance Costs With Flowserve GX-200 Non-Contacting Seal Retrofits," *Face-to-Face*, v17.1, 8 pgs.

GE Oil & Gas (2007) "Dry Gas Seal Retrofit," Florene, Italy, www.ge.com/oilandgas, 4 pgs.

Hopper, B. et al. (2008) "World's First 10,000 psi Sour Gas Injection Compressor," *Proceedings of the 37th Turbomachinery Symosium*, pp. 73-95.

Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.

Rameshni, Mahin "Strategies for Sour Gas Field Developments," *Worley Parsons-Brochure*, 20 pgs.

Reyes, S. C. et al. (1997) "Frequency Modulation Methods for Diffusion and Adsorption Measurements in Porous Solids," *J. Phys. Chem. B*. v101, pp. 614-622.

Ruthven, D. M. et al. (1996) "Performance of a Parallel Passage Adsorbent Contactor," *Gas. Sep. Purif.*, vol. 10, No. 1, pp. 63-73.

Stahley, J. S. (2003) "Design, Operation, and Maintenance Considerations for Improved Dry Gas Seal Realiability in Centrifugal Compressors," *Dresser-Rand, Tech. Paper 134*, 15 pages.

Suzuki, M. (1985) "Continuous-Countercurrent-Flow Approximation for Dynamic Steady State Profile of Pressure Swing Adsorption" *AIChE Symp. Ser.* v81 (242) pp. 67-73.

* cited by examiner

SELF-SUPPORTING STRUCTURES HAVING ACTIVE MATERIALS

CROSS-REFERENCE TO RELATED APPLICATIONS

This application claims priority to U.S. Provisional Patent Application No. 62/437,327 titled "Self-Supporting Structures Having Active Materials," filed on Dec. 21, 2016, and U.S. Provisional Patent Application No. 62/585,574 titled "Self-Supporting Structures Having Active Materials," filed on Nov. 14, 2017, having common inventors and assignee, the disclosure of which is incorporated by reference herein in its entirety.

This application is related to U.S. Provisional Patent Application No. 62/437,319 titled "Self-Supporting Structures Having Active Materials," filed on Dec. 21, 2016, the disclosure of which is incorporated by reference herein in its entirety.

FIELD

The present techniques relate to fabrication of self-supporting structures being open-celled and including active material. In particular, the self-supporting structures may be used in separation and/or catalysis processes, such as swing adsorption processes and other processes to enhance the recovery of hydrocarbons.

BACKGROUND

Processing techniques are useful in many industries and can typically be accomplished by flowing a mixture of fluids over an active material, such as a catalyst or adsorbent material, to provide the preferred product stream. For adsorption process, the adsorbent materials preferentially adsorbs one or more gas components, while not adsorbing one or more other gas components. The non-adsorbed components are recovered as a separate product. For catalytic processes, the catalyst is configured to interact with the components in the stream to increase the rate of a chemical reaction.

By way of example, one particular type of gas separation technology is swing adsorption, such as temperature swing adsorption (TSA), pressure swing adsorption (PSA), partial pressure purge swing adsorption (PPSA), rapid cycle pressure swing adsorption (RCPSA), rapid cycle partial pressure swing adsorption (RCPPSA), and not limited to but also combinations of the fore mentioned processes, such as pressure and temperature swing adsorption. As an example, PSA processes rely on the phenomenon of gases being more readily adsorbed within the pore structure or free volume of an active material, such as an adsorbent material, when the gas is under pressure. That is, the higher the gas pressure, the greater the amount of readily-adsorbed gas adsorbed. When the pressure is reduced, the adsorbed component is released, or desorbed from the adsorbent material.

The swing adsorption processes (e.g., PSA and TSA) may be used to separate gases of a gas mixture because different gases tend to fill the micropore of the adsorbent material to different extents. For example, if a gas mixture, such as natural gas, is passed under pressure through a vessel containing an adsorbent material that is more selective towards carbon dioxide than it is for methane, at least a portion of the carbon dioxide is selectively adsorbed by the adsorbent material, and the gas exiting the vessel is enriched in methane. When the adsorbent material reaches the end of its capacity to adsorb carbon dioxide, it is regenerated in a PSA process, for example, by reducing the pressure, thereby releasing the adsorbed carbon dioxide. The adsorbent material is then typically purged and repressurized. Then, the adsorbent material is ready for another adsorption cycle.

Typically, the structures used in catalytic processes and adsorption processes have a limited array of physical structure types. The active material are often structured into beads, granules, spheres or pellets using binders and processing techniques like extrusion or spray drying. The beads, granules, spheres or pellets are then packed together within a unit as a packed bed for the catalytic or adsorption processes. As a result, the conventional fabrication of catalysts or adsorbents, involve extrusions of small sphere-like active materials to be used in packed beds (e.g., spheres, pellets, lobes, etc.). However, the packed beds provide tortuous paths through the packed bed, which result in large pressure drops.

In other configurations, the structure may be an engineered structure, such as a monolith. In engineered structures, the active materials are coated onto substrates, such as a metal or ceramic monolith. The engineered structures provide substantially uniform flow paths, which lessen pressure drops as compared to packed beds. However, with these structures the majority of weight is inactive material that is used to form the underlying support structure.

As a result, typical fabrication approaches of structures involve extrusions of small sphere-like active materials to be used in packed beds (e.g., spheres, pellets, lobes, etc.), or the application of thin coatings of active material on monolith substrates (e.g., ceramic or metal monoliths). The packed beds have large pressure drops as compared with engineered structures. Also, the engineered structures include additional weight from structural support that is inactive material, which increases the size and weight of the structure.

Accordingly, there remains a need in the industry for apparatus, methods, and systems that provide enhancements in processes having self-supporting structures that include active materials and may include complex geometries. Further, the present techniques provide enhancements by integrating self-supporting open-celled structures with adsorption or catalytic processes, such as swing adsorption processes to separate contaminants from a feed stream. Accordingly, the present techniques overcome the drawbacks of conventional structures in separation and/or catalysis processes.

SUMMARY OF THE INVENTION

In one embodiment, a processing unit is described. The processing unit includes a housing forming an interior region; a self-supporting structure disposed within the interior region, wherein the self-supporting structure has greater than 50% by weight of the active material in the self-supporting structure, wherein the self-supporting structure is an open-celled structure configured to provide one or more defined channels for fluid flow paths through the self-supporting structure; and a plurality of valves secured to the housing, wherein each of the plurality of valves is configured to control fluid flow along a flow path extending between the self-supporting structure and a location external to the housing.

In one or more embodiment, the processing unit may include various enhancements. For example, the processing unit may include two or more of the plurality of valves are operated via common actuation mechanism; the processing unit may be a cyclical swing adsorbent bed unit configured to remove contaminants from a gaseous feed stream that passes through the self-supporting structure; the self-supporting structure may have greater than 60% by weight of the active material in the self-supporting structure or the self-supporting structure may have greater than 70% by weight of the active material in the self-supporting structure; the self-supporting structure may have an inert support member (e.g., inorganic or inactive support member) coated by the active material in the self-supporting structure (e.g., inert with respect to the stream passing through the self-supporting structure or inert at operating conditions); may include a flow distributor disposed between the adsorbent bed and the plurality of valves; the housing may be configured to maintain a pressure from 5 pounds per square inch absolute (psia) and 1,400 psia; the self-supporting structure may have a layer of active material that is greater than 10 micrometers or may have a layer of active material that is greater than 100 micrometers; wherein the one or more defined channels comprise two or more channels that are substantially parallel and/or the self-supporting structure has a low thermal mass.

In yet another embodiment, a method for removing contaminants from a feed stream is described. The method comprises: a) performing one or more adsorption steps in an adsorbent bed unit, wherein each of the one or more adsorption steps comprise: passing a gaseous feed stream through the self-supporting structure disposed in an interior region of a housing of the adsorbent bed unit to remove one or more contaminants from the gaseous feed stream, wherein the self-supporting structure has greater than 50% by weight of the active material in the self-supporting structure, wherein the self-supporting structure is an open-celled structure configured to provide one or more defined channels for fluid flow paths through the self-supporting structure; b) performing one or more regeneration steps, wherein each of the one or more regeneration steps comprise conducting away at least a portion of the one or more contaminants in a contaminant output stream; and c) repeating the steps a) to b) for at least one additional cycle.

Further, in one or more embodiment, the method for removing contaminants from a feed stream may include various enhancements. For example, the method may be a swing adsorption method and the cycle duration may be for a period greater than 1 second and less than 600 seconds or a period greater than 1 second and less than 300 seconds; wherein the performing one or more regeneration steps comprises performing one or more purge steps, wherein each of the one or more purge steps comprise passing a purge stream through the self-supporting structure to conduct away at least a portion of the one or more contaminants in the contaminant output stream; wherein the gaseous feed stream may be a hydrocarbon containing stream having greater than one volume percent hydrocarbons based on the total volume of the gaseous feed stream; wherein a feed pressure of the gaseous feed stream may be in the range between 400 pounds per square inch absolute (psia) and 1,400 psia; wherein performing the one or more adsorption steps may be configured to lower the carbon dioxide ($CO_2$) level to less than 50 parts per million volume; wherein performing the one or more adsorption steps may be configured to lower the water ($H_2O$) level to less than 105 parts per million volume; and/or the self-supporting structure has a low thermal mass.

In yet another embodiment, a method of manufacturing a processing unit is described. The method may include: creating a template for a self-supporting structure; disposing a mixture within the template, wherein the mixture has greater than 50% by weight of the active material in the self-supporting structure and the remaining mixture includes binder material; curing the template and the mixture to form a self-supporting structure that is maintains a solid form; removing the template from the self-supporting structure, wherein the self-supporting structure is an open-celled structure configured to provide one or more defined channels for fluid flow paths through the self-supporting structure based on the template; and disposing the self-supporting structure within housing of a processing unit having an interior region.

Moreover, in one or more embodiment, the method of manufacturing a processing unit may include various enhancements. For example, the method may include creating a three-dimensional model of the self-supporting structure having predetermined geometries for one or more defined channels in the through the self-supporting structure; may include creating a model of a template based on the three-dimensional model of the self-supporting structure; may include printing a three-dimensional template based on the model of the template; wherein removing the template from the self-supporting structure may further comprise heating the self-supporting structure and the template to melt or decompose the template and conduct away the melted template; may include vibrating the template and the mixture prior to curing the template and mixture to lessen any voids that may be formed between the template and mixture; wherein curing the template and the mixture may further comprise sintering the binder material and active material into a cohesive solid structure that is the self-supporting structure; and/or may include creating a plurality of valve ports into the housing; and securing a valve to the housing in each of the plurality of valve ports to form a plurality of valves, wherein each of the plurality of valves is configured to control fluid flow between the self-supporting structure and a location external to the housing.

Further still, in yet another embodiment, a method of manufacturing a processing unit is described. The method comprises: extruding a mixture into a monolith form comprising a plurality of substantially parallel channels, separated by thin walls, wherein the mixture has greater than 50% by weight of the active material in the self-supporting structure and the remaining mixture includes binder material; drying the monolith form; and calcining the monolith form from 400° C. to 800° C. to form a mechanically stable, active monolith form; wherein the plurality of substantially parallel channels have a cross sectional shape of a square, a circle, a triangular, or a hexagonal; wherein the cell density of the monolith form is in a range between 200 cells per square inch and 2,000 cells per square inch; and wherein the walls separating the plurality of substantially parallel channels have a thickness in the range between 40 micron to 1 millimeter.

BRIEF DESCRIPTION OF THE FIGURES

The foregoing and other advantages of the present disclosure may become apparent upon reviewing the following detailed description and drawings of non-limiting examples of embodiments.

DETAILED DESCRIPTION OF THE INVENTION

Figure 1:
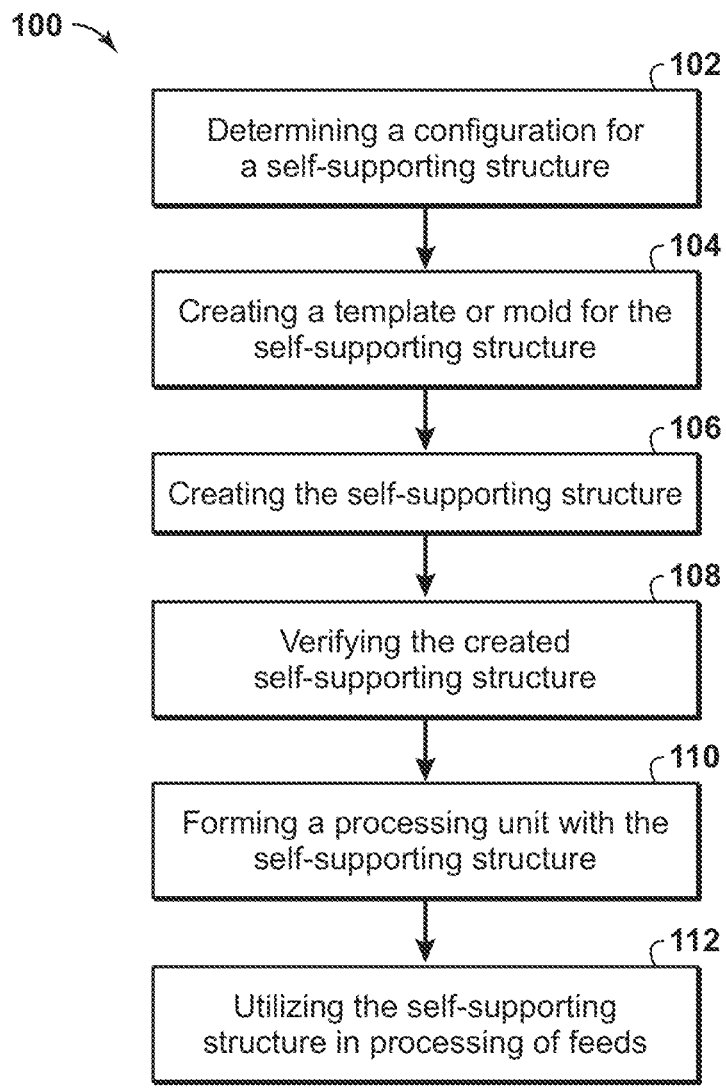
FIG. 1 is a flow diagram of a method for fabricating and using a self-supporting structure in accordance with an embodiment of the present techniques.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

As used herein, "majority component" means greater than 50% by weight.

As used herein, "open-celled" refers to structures having open channel networks, compared to extruded solid shapes, such as spheres or pellets. The open-celled structures include monoliths or other engineered structures that provide flow paths through channels or passages in the respective structure.

As used herein, "stream" refers to a fluid (e.g., solids, liquid and/or gas) being conducted through various equipment. The equipment may include conduits, vessels, manifolds, units or other suitable devices.

As used herein, volume percent is based on standard conditions. The standard conditions for a method may be normalized to the temperature of 0° C. (e.g., 32° F.) and absolute pressure of 100 kiloPascals (kPa) (1 bar).

The present techniques relate to the fabrication of self-supporting structures from active material, which may have complex geometries and be open-celled structures. In particular, the present techniques relate to enhancements in the self-supporting structures that contain a majority of active material (e.g., greater than 50% by weight or greater than or equal to 60% by weight) to provide enhanced structures. The enhanced structures may provide flexibility through customizable configurations, which may enhance the flow paths and provide higher volumetric efficiency in the configurations, which are lighter than conventional structures. The self-supporting structures may be configured to have various defined channels to provide fluid flow paths through the structure.

The self-supporting structures may be useful in various chemical and engineering applications. The self-supporting structures of active material may be referred to engineered into various geometric structures. By way of example, certain methods may be enhanced with the active materials, such as adsorption and catalytic processes. In particular, a self-supporting structure may be used instead of a packed adsorbent bed, which have higher pressure drops and slower mass transfer rates. In the packed bed configurations, the pressure drops and mass transfer limitations do not permit or are inefficient in operating the adsorption or catalytic processes at rapid cycles. Further, large volume gas separation processes, which rely upon pressure swing adsorption and rapid cycling, involve self-supporting structures with low pressure drop and high volumetric efficiency. The present techniques may provide enhancements to the associated structures to enhance the respective method and associated economics.

The self-supporting structure may be fabricated from various techniques, such as intrusion and extrusion techniques. For example, the techniques may include intrusion processes that employs three-dimensional (3D) printing. The 3D printing approach may use templates to produce custom structures of active material (e.g., a zeolite) that is combined with a binder material. By using the templates, the self-supporting structure may be formed into complex geometries, which may be an open-celled structure configured to provide defined channels for fluid flow paths through the structure. As another example, an extrusion method may be employed to produce monolith structures composed of the active material combined with the binder material. Both fabrication methods may utilize active materials, such as active inorganic materials, that are stable to high temperature calcinations (e.g., equal to or greater than 500° C.) and combination of organic and inorganic binders.

By way of example, the present techniques may also utilize 3D printing techniques to design and produce custom self-supporting structures made of active materials. The use of 3D printing and intrusion methods provide geometric flexibility in the design of structures that may not be made using conventional extrusion methods. These structures may form an open-celled structures, which are configured to provide defined channels for fluid flow paths through the respective structure. Further, engineering flexibility in the adsorbent material structures is also provided, which removes the use and reliance on a ceramic or metal substrate, which lessen the cost of fabricating the self-supporting structures, such as adsorbent beds.

The present techniques may also include an extrusion method to produce bulk monolith structures, which have the active material as the majority component. In contrast, conventional techniques involve applying a thin coating of active material to an inactive substrate, such as an inert ceramic or metal monolith substrates. The inactive substrate, which typically provides mechanical support for the thin coating of active material, is more than 90% of the total weight of the self-supporting structure. Accordingly, the thin coating of active material in conventional self-supporting structures equal to or less than 10% of the total weight of the self-supporting structure.

In certain configurations, the self-supporting structure may include different combinations of active material and binder material. For example, the self-supporting structure may be fabricated from a microporous zeolites, which may be the active material. In certain configurations, the active material may be greater than or equal to 25% by weight of the self-supporting structure; greater than or equal to 40% by weight of the self-supporting structure; greater than or equal to 50% by weight of the self-supporting structure; greater than or equal to 60% by weight of the self-supporting structure; or greater than or equal to 70% by weight of the self-supporting structure; while the remaining portion may include binder material. In other configurations, the binder material may be less than 75% by weight of the self-supporting structure; less than 60% by weight of the self-supporting structure; less than 50% by weight of the self-supporting structure; less than 40% by weight of the self-supporting structure; or less than 30% by weight of the self-supporting structure; while the remaining portion may include active material.

The self-supporting structure may include higher masses of active material per unit volume that is greater than conventional coating techniques. For example, the layer or thickness of active material that is greater than 10 micrometers, is greater than 100 micrometers or is greater than 200 micrometers.

The active materials may include one or more adsorbent materials in certain configurations to adsorb contaminants from the stream. By way of example, the active materials may include zeolites, aluminophosphate molecular sieves (e.g., AlPOs and SAPOs), ZIFs (zeolitic imidazolate frameworks (e.g., ZIF-7, ZIF-9, ZIF-8, ZIF-11, etc.) and carbons, as well as mesoporous materials, such as the amine functionalized MCM materials, SBA, KIT materials. Other example of active materials may include cationic zeolites, amine-functionalized mesoporous materials, stannosilicates, and/or carbons. In other configurations, the adsorbent materials may include zeolite type A (e.g., LTA structures), such as 3A, 4A, 5A and/or 13X (which are highly porous adsorbents that have a high affinity and high capacity to adsorb water, as well as other molecules that have dimensions small enough to fit into the uniform pores of these structures), 8-member ring zeolite materials (e.g., ZSM 58 and/or DDR).

In other configurations, the active material may include one or more catalytic materials that are configured to react with the components in the stream.

In addition, various enhancements in macro-pore engineering may be used to provide additional pores and porosity. In particular, polymer spheres may be added to the composition, which may be diminished or removed (e.g., a material that may be burn out) when calcination process is performed on the composition. These polymer spheres may be used to increase the system porosity and enhance the diffusional performance.

The binder materials may include organic and inorganic binders. The organic binder may include, for example, 2% aqueous solution of methyl cellulose derivatives. The inorganic binder material may include, for example, $SiO_2$ and/or clays. Silica particle diameter may be in the range between 25 nanometer and 1,000 nanometer and silica particles in a string of pearls configuration.

By way of example, a processing unit may include a housing forming an interior region; a self-supporting structure disposed within the interior region, wherein the self-supporting structure has greater than 50% by weight of the active material in the self-supporting structure, wherein the self-supporting structure is an open-celled structure configured to provide one or more defined channels for fluid flow paths through the self-supporting structure; and a plurality of valves secured to the housing, wherein each of the plurality of valves is configured to control fluid flow along a flow path extending between the self-supporting structure and a location external to the housing. In various configurations, the processing unit may include two or more of the plurality of valves are operated via common actuation mechanism; the processing unit may be a cyclical swing adsorbent bed unit configured to remove contaminants from a gaseous feed stream that passes through the self-supporting structure; the self-supporting structure may have greater than 60% by weight of the active material in the self-supporting structure or the self-supporting structure may have greater than 70% by weight of the active material in the self-supporting structure; the self-supporting structure may have a support member coated by the active material in the self-supporting structure, for example, a washcoated ceramic or metal structure; may include a flow distributor disposed between the adsorbent bed and the plurality of valves; the housing may be configured to maintain a pressure from 5 pounds per square inch absolute (psia) and 1,400 psia; the self-supporting structure may have a layer of active material that is greater than 10 micrometers or may have a layer of active material that is greater than 100 micrometers; wherein the one or more defined channels comprise two or more channels that are substantially parallel and/or the self-supporting structure has a low thermal mass.

As yet another example, a method for removing contaminants from a feed stream may include: a) performing one or more adsorption steps in an adsorbent bed unit, wherein each of the one or more adsorption steps comprise: passing a gaseous feed stream through the self-supporting structure disposed in an interior region of a housing of the adsorbent bed unit to remove one or more contaminants from the gaseous feed stream, wherein the self-supporting structure has greater than 50% by weight of the active material in the self-supporting structure, wherein the self-supporting structure is an open-celled structure configured to provide one or more defined channels for fluid flow paths through the self-supporting structure; b) performing one or more regeneration steps, wherein each of the one or more regeneration steps comprise conducting away at least a portion of the one or more contaminants in a contaminant output stream; and c) repeating the steps a) to b) for at least one additional cycle. In certain configurations, the method may be a swing adsorption method and the cycle duration may be for a period greater than 1 second and less than 600 seconds or a period greater than 1 second and less than 300 seconds; wherein the performing one or more regeneration steps comprises performing one or more purge steps, wherein each of the one or more purge steps comprise passing a purge stream through the self-supporting structure to conduct away at least a portion of the one or more contaminants in the contaminant output stream; wherein the gaseous feed stream may be a hydrocarbon containing stream having greater than one volume percent hydrocarbons based on the total volume of the gaseous feed stream; wherein a feed pressure of the gaseous feed stream may be in the range between 400 pounds per square inch absolute (psia) and 1,400 psia; wherein performing the one or more adsorption steps may be configured to lower the carbon dioxide ($CO_2$) level to less than 50 parts per million volume; wherein performing the one or more adsorption steps may be configured to lower the water ($H_2O$) level to less than 105 parts per million volume; wherein the one or more defined channels comprise two or more channels that are substantially parallel and/or the self-supporting structure has a low thermal mass.

As yet another example, a method of manufacturing a processing unit may include: creating a template for a self-supporting structure; disposing a mixture within the template, wherein the mixture has greater than 50% by weight of the active material in the self-supporting structure and the remaining mixture includes binder material; curing the template and the mixture to form a self-supporting structure that is maintains a solid form; removing the template from the self-supporting structure, wherein the self-supporting structure is an open-celled structure configured to provide one or more defined channels for fluid flow paths through the self-supporting structure based on the template; and disposing the self-supporting structure within housing of a processing unit having an interior region. In certain configurations, the method may include creating a three-dimensional model of the self-supporting structure having predetermined geometries for one or more defined channels through the self-supporting structure (e.g., the open-celled structure is configured to provide defined channels for fluid flow paths through the structure); may include creating a model of a template based on the three-dimensional model of the self-supporting structure; may include printing a three-dimensional template based on the model of the template; wherein removing the template from the self-supporting structure may further comprise heating the self-supporting structure and the template to melt or decompose the template and conduct away the melted template; may include vibrating the template and the mixture prior to curing the template and mixture to lessen any voids that may be formed between the template and mixture; wherein curing the template and the mixture may further comprise sintering the binder material and active material into a cohesive solid structure that is the self-supporting structure; and/or may include creating a plurality of valve ports into the housing; and securing a valve to the housing in each of the plurality of valve ports to form a plurality of valves, wherein each of the plurality of valves is configured to control fluid flow between the self-supporting structure and a location external to the housing.

Further still, in yet another configuration, a method of manufacturing a processing unit is described. The method comprises: extruding a mixture into a monolith form comprising a plurality of substantially parallel channels, separated by thin walls, wherein the mixture has greater than 50% by weight of the active material in the self-supporting structure and the remaining mixture includes binder material; drying the monolith form; and calcining the monolith form from 400° C. to 800° C. to form a mechanically stable, active monolith form; wherein the plurality of substantially parallel channels have a cross sectional shape that may be a square, a circle, a triangular, or a hexagonal; wherein the cell density of the monolith form is in a range between 200 cells per square inch and 2,000 cells per square inch (e.g., cross sectional shape is along a plane that is perpendicular to the primary flow path for the feed stream through the self-supporting structure); and wherein the walls separating the plurality of substantially parallel channels have a thickness in the range between 40 micron to 1 millimeter. Further, the method may include disposing the self-supporting structure within housing of a processing unit having an interior region and/or may include creating a plurality of valve ports into the housing; and securing a valve to the housing in each of the plurality of valve ports to form a plurality of valves, wherein each of the plurality of valves is configured to control fluid flow between the self-supporting structure and a location external to the housing.

Beneficially, the present techniques provide self-supporting structures that may be utilized to provide various enhancements over conventional approaches. For example, the present techniques may provide structures that provide geometric design flexibility and provide custom structures and flow paths. The custom structures may be an open-celled structure configured to provide defined channels for fluid flow paths through the structure, which enhance the interaction of the active material with the fluid passing through the channels. Further, by utilizing the active material to form the self-supporting structure, the working capacity may be increased and volumetric efficiency may be enhanced, which may further lessen the size of the structure and associated weight of the structure. The lessening of the size and weight may also lessen the associated size of the equipment utilized with the housing that contains the self-supporting structure. The present techniques may be further understood with reference to the FIGS. 1 to 14 below.

FIG. 1 is a flow diagram 100 of a method for fabricating and using a self-supporting structure in accordance with an embodiment of the present techniques. In this diagram 100, the method includes fabricating a self-supporting structure including active material along with using the self-supporting structure. In particular, the method may include determining a configuration for the self-supporting structure, as shown in block 102, creating a mold or template for the self-supporting structure, as shown in block 104, producing the self-supporting structure as shown in blocks 106 and 108, and forming a processing unit with the self-supporting structure and utilizing the self-supporting structure in processing of feeds, as shown in blocks 110 and 112.

The method begins at block 102. In block 102, a configuration for a self-supporting structure is determined. This determination may involve modeling and identifying various aspects of the self-supporting structure to enhance process engineering selections, such as determining the mechanical features of the self-supporting structure, determining flow paths (e.g., the level of tortuousness of the flow path) through the self-supporting structure, determining the cell size within the self-supporting structure, determining the pressure drop for flow through the self-supporting structure, determining the operating conditions that the self-supporting structure may be subject to during process operations (e.g., pressures, temperatures and stream compositions) and/or determining the contaminants to be adsorbed by the active material in the self-supporting structure.

Once the configuration for the self-supporting structure is determined, a mold is created for the self-supporting structure, as shown in block 104. The creation of the self-supporting structure may involve modeling the desired structure and then three-dimensional (3D) printing the mold or template from a specific material. The template material utilized in the three-dimensional printing may include materials that may be dissolved as part of the self-supporting structure fabrication process, or may be materials that may be removed from the resulting self-supporting structure. For example, the template may include plastics, such as Acrylonitrile Butadiene Styrene (ABS), polylactide (PLA), and/or other suitable plastics and/or waxes.

Once the mold is created, the self-supporting structure is produced, as shown in blocks 106 and 108. At block 106, the self-supporting structure is created. The creation of the self-supporting structure may involve mixing an active material with organic and/or inorganic binders to provide a specific formulation. The mixture, which may be an aqueous slurry, may be provided to the mold directly, or may be combined with the mold inside a container or vessel. The container or vessel may be used to vibrate the mold and mixture to lessen any voids that may be formed between the mold and mixture. Then, the mold and mixture may be processed to cure the mixture into a solid form. The processing may include heating the mold and mixture to dry and/or cure the mixture and melt or decompose the mold. At block 108, the created self-supporting structure may be verified. The verification of the created self-supporting structure may include using sensors to obtain measurements on the created self-supporting structure to identify voids, fractures and/or non-homogeneous sections of the created self-supporting structure. The verification may include performing a high temperature x-ray diffraction on the self-supporting structure. For example, a high temperature x-ray diffraction scan indicates that an active component of 5A zeolite is stable at 860° C. for several minutes and then loses stability, as shown by decreasing peak heights. This analysis may be used to determine maximum temperatures and time for calcination of the self-supporting structures. The mechanical strength of the self-supporting structures is related to calcination temperatures greater than 500° C.

Once the self-supporting structure is produced, the self-supporting structure is formed into a processing unit, as shown in block 110. The forming the processing unit, may involve disposing the self-supporting structure within a housing, coupling a head to the housing, coupling one or more valves (e.g., poppet valves) to the housing and coupling one or more conduits to the housing and/or one or more of the valves. The processing unit may be an adsorbent bed unit that includes a housing, which may include a head portion coupled to one or more body portions, that forms a substantially gas impermeable partition. The housing may include the self-supporting structure (e.g., formed as an adsorbent bed) disposed within an interior region enclosed by the housing. Various valves may be configured to provide fluid flow passages through openings in the housing between the interior region of the housing and locations external to the housing. Then, the self-supporting structure may be utilized in processing of fluids, as shown in block 112. For example, the processing of feeds may include performing swing adsorption method (e.g., rapid cycle processes) for the removal of one of more contaminants from a feed stream. Other examples may include utilizing the self-supporting structure in a catalytic process.

One method for forming the self-supporting structure may involve the use of 3D molds or templates. By way of example, the self-supporting structure, which may include complex geometries, may be prepared by modeling techniques (e.g., modeling software) to model the shape of the three dimensional objects that are used as templates. The modeling software may produce sets of location coordinates (e.g., x, y, z coordinates), which may be used by a 3D printer to construct a plastic mold or template, in a layer-by-layer method. A high solids aqueous slurry of active material, organic and inorganic binders and other additives may be processed and added to the mold. The organic binder acts as a temporary binder to facilitate particle cohesion during low temperature processing and drying. The slurry is dried and calcined in the template (e.g., the plastic 3D printed mold). During the calcination process, which may be performed at 500° C. or higher, the plastic mold melts or decomposes, the inorganic binder and active material particles sinter into a cohesive, self-supporting structure with a geometric form derived from the mold. As a result, the self-supporting structure may be an open-celled structure configured to provide defined channels for fluid flow paths through the structure, which are based on the template. Various different templates or molds are shown in FIGS. 2A to 7B, as examples of the different self-supporting structure that may be created.

Figure 2A:
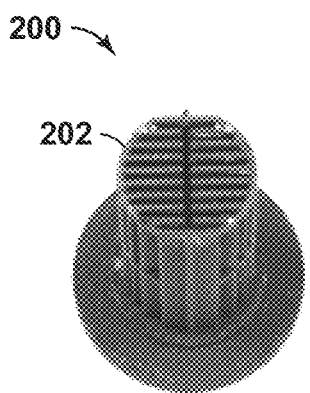
FIGS. 2A, 2B and 2C are various diagrams of a mold, combined mold and mixture and resulting self-supporting structure in accordance with an embodiment of the present techniques.
Figure 2B:
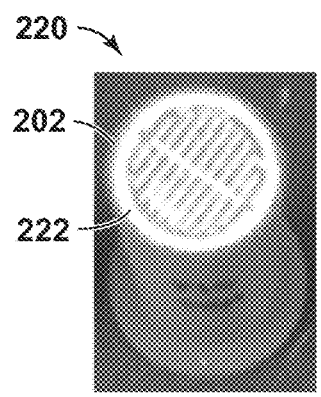
Figure 2C:
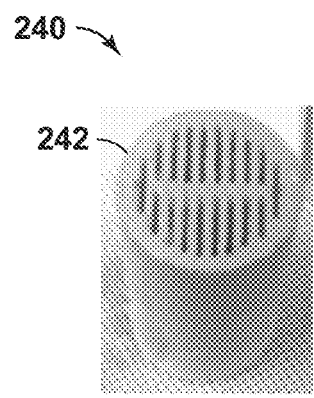

FIGS. 2A, 2B and 2C are various diagrams 200, 220 and 240 of a mold, combined mold and mixture and resulting self-supporting structure in accordance with an embodiment of the present techniques. In FIG. 2A, a plastic mold 202 is shown, which may be a 3D printed sacrificial template or mold having a circular prism shape. In FIG. 2B, the mold 202 is combined with the mixture 222, which includes active material and binder. The resulting self-supporting structure 242 is shown in FIG. 2C. The resulting self-supporting structure 242 is a laminar sheet structure of $3A/SiO_2$ (e.g., about a 70:30 ratio of active material by weight to binder by weight for the self-supporting structure (w/w)) formed by intrusion. The self-supporting structure 242 has a 1 inch diameter by 2 inch length, total weight of 19.02 grams, which includes 13.3 grams of 3A zeolite and 5.7 grams of $SiO_2$ binder.

Figure 3A:
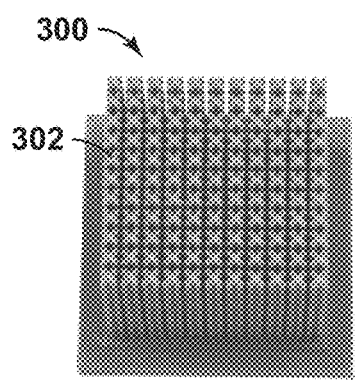
FIGS. 3A, 3B and 3C are various diagrams of a mold, combined mold and mixture and resulting self-supporting structure in accordance with another embodiment of the present techniques.
Figure 3B:
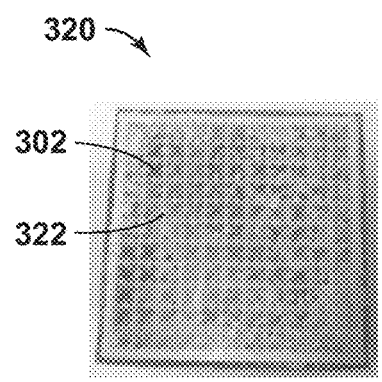
Figure 3C:
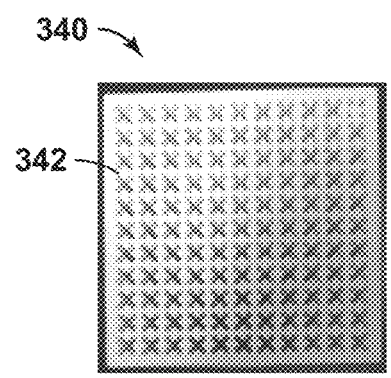

FIGS. 3A, 3B and 3C are various diagrams 300, 320 and 340 of a mold, combined mold and mixture and resulting self-supporting structure in accordance with another embodiment of the present techniques. In FIG. 3A, a plastic mold 302 is shown, which may be a 3D printed sacrificial mold having a rectangular prism shape. In FIG. 3B, the mold 302 is combined with the mixture 322 of binder and active material. The resulting self-supporting structure 342 is shown in FIG. 3C. The resulting self-supporting structure 342 is a fractal-type structure of $3A/SiO_2$ (e.g., about 70:30 w/w) formed by intrusion. The self-supporting structure 342 has a 2.25 inch width by 2 inch length.

Figure 4A:
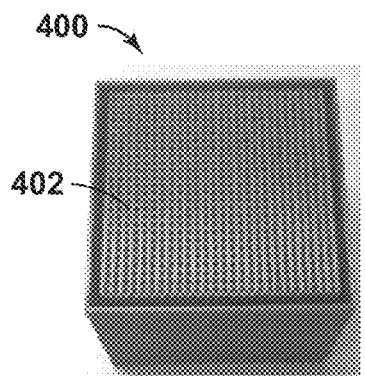
FIGS. 4A, 4B and 4C are various diagrams of a mold, combined mold and mixture and resulting self-supporting structure in accordance with yet another embodiment of the present techniques.
Figure 4B:
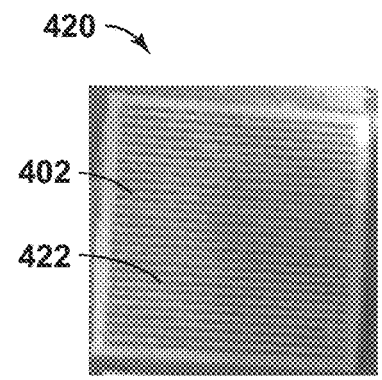
Figure 4C:
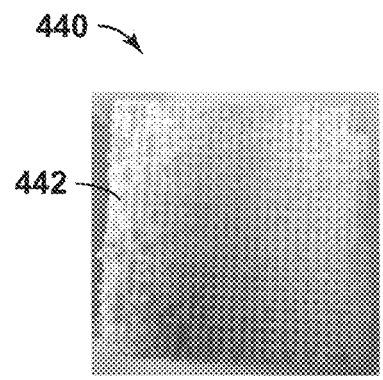

FIGS. 4A, 4B and 4C are various diagrams 400, 420 and 440 of a mold, combined mold and mixture and resulting self-supporting structure in accordance with yet another embodiment of the present techniques. In FIG. 4A, a plastic mold 402 is shown, which may be a 3D printed sacrificial mold having a rectangular prism shape. In FIG. 4B, the mold 402 is combined with the mixture 422 of binder and active material. The resulting self-supporting structure 442 is shown in FIG. 4C. The resulting self-supporting structure 442 is a cross-flow structure of 3A/SiO$_2$ (e.g., about 70:30 w/w) formed by intrusion. The self-supporting structure 442 has a 2.25 inch width by 2 inch length, which has six faces of interconnecting channels.

Figure 5A:
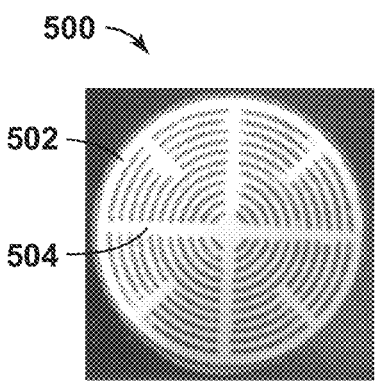
FIGS. 5A and 5B are various diagrams of a combined mold and mixture and resulting self-supporting structure in accordance with still yet another embodiment of the present techniques.
Figure 5B:
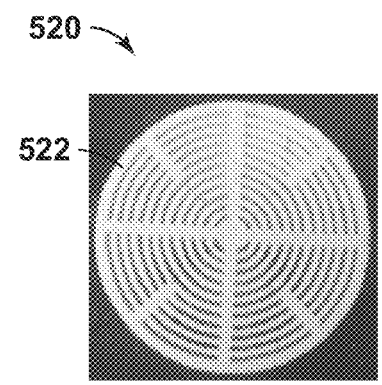

FIGS. 5A and 5B are various diagrams 500 and 520 of a combined mold and mixture and resulting self-supporting structure in accordance with still yet another embodiment of the present techniques. In FIG. 5A, a plastic mold 502 is shown with a mixture 504 of active material and binder. The mold 502 may be a 3D printed sacrificial mold having a circular prism shape. The resulting self-supporting structure 522 is shown in FIG. 5B. The resulting self-supporting structure 522 is a crescent structure of 3A/SiO$_2$ (e.g., 70:30 w/w) formed by intrusion. The self-supporting structure 522 has a 2.25 inch diameter by 2 inch length, which may be formed by a calcination process.

Figure 6A:
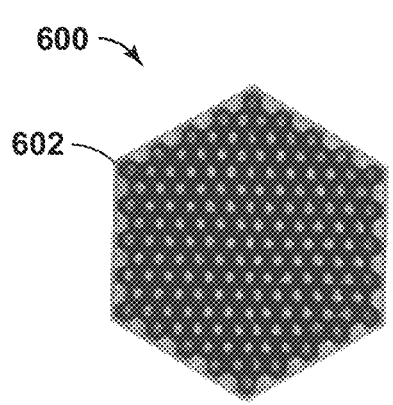
FIGS. 6A and 6B are various diagrams of a mold and a self-supporting structure in accordance with another embodiment of the present techniques.
Figure 6B:
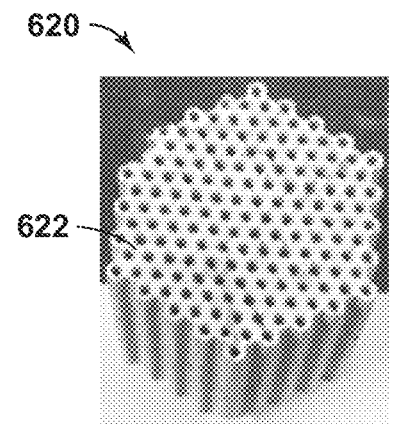

FIGS. 6A and 6B are various diagrams 600 and 620 of a mold and a self-supporting structure in accordance with another embodiment of the present techniques. In FIG. 6A, a plastic mold 602 is shown, which may be a 3D printed sacrificial mold having a hexagonal prism shape. The resulting self-supporting structure 622 is shown in FIG. 6B. The resulting self-supporting structure 622 is a hexagonal structure of ZSM 58/SiO$_2$ (e.g., 70:30 w/w) formed by intrusion. The self-supporting structure 622 has a 2.25 inch width by 2 inch length, which may be formed by a calcination method heating the mixture to about 500° C.

Figure 7A:
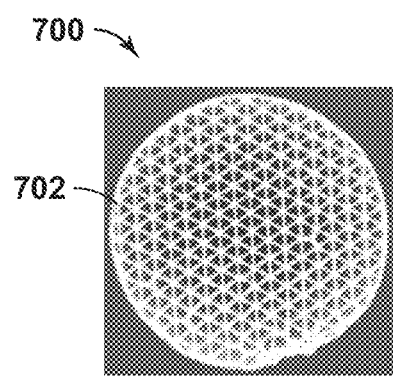
FIGS. 7A and 7B are various diagrams of two monolith structures in accordance with an embodiment of the present techniques.
Figure 7B:
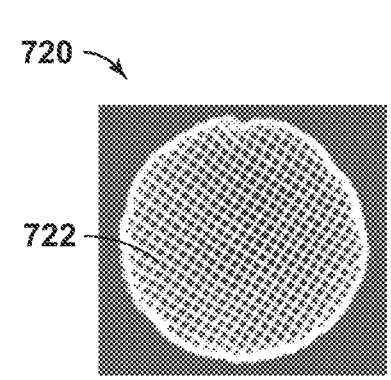

FIGS. 7A and 7B are various diagrams 700 and 720 of two monolith structures in accordance with an embodiment of the present techniques. In FIG. 7A, the self-supporting structure 702 is a circular structure of 5A/SiO$_2$ (e.g., 70:30 w/w) formed by an extrusion process. The self-supporting structure 622 has a 1 inch diameter by 3 inch length, and has cells that are triangular shaped. In FIG. 7B, the self-supporting structure 722 is a circular structure of 5A/SiO$_2$ (e.g., 70:30 w/w) formed by an extrusion process. The self-supporting structure 722 has a 1 inch diameter by 3 inch depth and has cells that are square shaped.

To cure the mixture into the self-supporting structure, the thermal stability of active material by high temperature may be assessed. As noted above, one of the final steps in creating a self-supporting structure may include calcination. Calcination at high temperatures, which may include temperatures equal to or greater than 500° C., dehydrates the zeolite and SiO$_2$ particle mixture and coalesces the mixture into more dense structures that result in enhanced mechanical strength. To assess the high temperature stability of the active material (e.g., adsorbent or catalyst material) for calcination purposes, a high temperature x-ray diffraction may be performed on the self-supporting structure. For example, a high temperature x-ray diffraction scans may provide a representation to indicate that the 5A zeolite (e.g., active material) was stable at a specific temperature for a certain period of time (e.g., about 860° C. for several minutes) and then loses stability, which may be shown by decreasing peak heights. Accordingly, this type of analysis may be used to determine the maximum temperatures and time for calcination of the structures. The mechanical strength of the self-supporting structures is related to calcination temperatures greater than 500° C.

Figure 8:
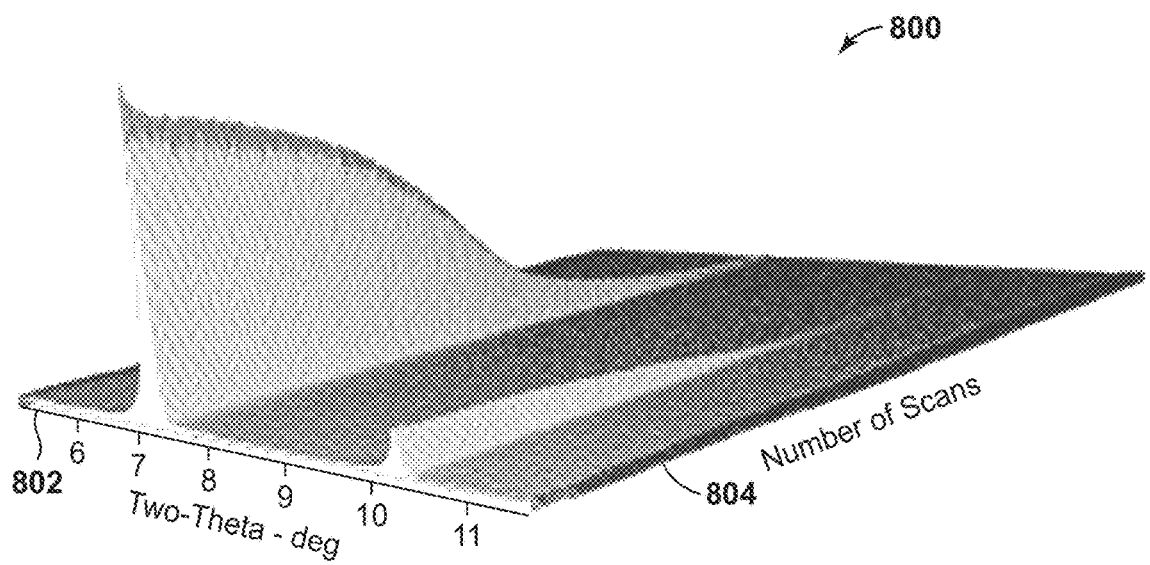
FIG. 8 is an exemplary diagram of an x-ray diffraction scan of the self-supporting structure.

FIG. 8 is an exemplary diagram 800 of an x-ray diffraction scan of the self-supporting structure. In the diagram 800, the x-ray diffraction scan of the self-supporting structure is performed at 860° C. that monitored the first 2-theta peaks of 5A zeolite on the two-theta axis 802 in degrees versus the number of scans axis 804. The scans may be performed using an x-ray diffractometer with a high temperature environmental cell. The scans may be performed every minute, which includes the 48 second scan time and 12 second reset time. The scans may be conducted in the 2° to 12° 2 theta region at 860° C. for six hours.

By way of example, the preparation scheme for producing self-supporting structures resulting from processing the materials in 3D printed plastic molds or templates. A high solids aqueous mixture of adsorbent zeolite or catalyst powder and organic and inorganic binder materials was prepared. The well-mixed slurry was added into 3D printed plastic mold, while vibrating the mold and slurry. The mixture was dried and calcined to 500° C. or higher inside the plastic mold producing an active, mechanically stable structure with a geometry derived from the mold. The channels are defined channels for fluid flow paths through the structure based on the plastic mold.

For example, 118.3 grams of 3A zeolite powder may be added to a container (e.g., a plastic bowl or cup). Then, 126.75 grams of colloidal silica (40 wt. % solution with 25 nanometers (nm) suspended SiO$_2$ particles) may be added to the 3A zeolite powder in the container. The mixture rapidly heats to 65° C. (e.g., self-heated), due to heat of adsorption of the water into the 3A zeolite. Then, the sample may be cooled to room or ambient temperatures, which results in the mixture being a damp solid. Then, it is mixed well for 1 to 2 minutes at 2,000 revolutions per minute (rpm). In a separate container, 15.02 grams of water and 10.3 grams of 1.5% methylcellulose polymer (used as organic binder) may be mixed and once mixed, added to the container containing the 3A zeolite along with the colloidal silica. The combined mixture was mixed at 2,000 rpm for 2 minutes. The resulting viscous, pourable slurry may be decanted into a 3D printed plastic mold.

Self-supporting structure may be fabricated from a 3D template intrusion structures. The intruded adsorbent zeolite structures, after calcination, consist of 70:30 weight/weight of zeolite adsorbent to SiO$_2$ binder. The zeolite particles may be in the range between 2 micron diameter and 25 micron diameter. The SiO$_2$ binder particles used were either 25 nanometer (nm) or 100 nm monodisperse particles. The particle size distribution of the Linde Type A (LTA) adsorbent powders indicates that the particle size ranges are 2 micrometer (μm) to 5 μm, with a mean value of 4 μm (e.g., Zeolite A (Linde Division, Union Carbide)). The particle size distribution of the ZSM-58 adsorbent powders indicates that the particle size ranges are 20 μm to 30 μm, with a mean value of 25 μm. Zeolite or other inorganic catalytic particles are not inherently cohesive after a high temperature calcination processes. The organic binder materials used were a 1% aqueous solution of methyl cellulose derivatives.

Also, the aqueous slurry sample was prepared at 65 weight percentage (wt. %) solids in aqueous slurry. The ratio of adsorbent zeolite to SiO$_2$ (e.g., 25 nm) binder was about a 70:30 (w/w). On a dry basis, the 3A zeolite and SiO$_2$ are solids, which has formulation targets of a 70:30 dry weight ratio. The organic binder (e.g., methyl cellulose and/or methyl cellulose derivatives) target was 0.06 wt. % organic binder solid in total slurry weight, or 6 wt. % as a 1 wt. % organic binder solution in total slurry weight.

The aqueous slurry was well mixed using an asymmetric mixer for one to three minutes at 1,000 to 2,500 revolutions per minute (rpm). Further, small alumina agates were added to reduce any solid agglomerates, if needed.

The resulting viscous, pourable slurry was decanted into a 3D printed plastic mold. The structure was vibrated for fifteen to twenty minutes during addition and afterwards, using a vibrating table.

The LTA zeolite self-supporting structures involved a modified slurry preparation method because of the rapid temperature increase, as a result of high $H_2O$ adsorption. The slurry temperatures increase quickly from room temperature to 70° C. within seconds. The 70° C. temperature can decompose common aqueous organic binders, such as methyl cellulose, which cause them to become irreversibly insoluble. Thus, with LTA slurry preparations, the aqueous organic binder was added to a slurry of LTA and colloidal $SiO_2$ after the LTA zeolite/$SiO_2$ mixture had cooled to room temperature to avoid damaging the aqueous organic binder properties.

As an example, the self-supporting structure may include an example of 3A/$SiO_2$ (25 nm) slurry and fractal-type structure preparation. In forming the mixture, 118.33 grams of 3A zeolite, a white fine powder, was added to a tared plastic jar. Then, 126.75 grams of colloidal silica was added to the 3A in the jar and contents were mixed with a spatula. The colloidal silica is 40 wt. % $SiO_2$ solution, while the diameter size of the $SiO_2$ particles in the solution are 25 nanometers (nm). There was a rapid temperature rise to 65° C. as the 3A material adsorbed much of the water in the colloidal solution. After the sample cooled to room temperature, the jar was capped and the contents were placed inside an asymmetric mixer for one to two minutes at 1,500 to 2,000 rpms to mix the sample, resulting in a gritty, damp solid. In a separate jar, 15.02 grams of water were added, followed by 10.32 grams of a 1.5 wt. % methylcellulose organic binder solution. The sample was mixed and the resulting viscous solution was added to the 3A/$SiO_2$ mixture. The combined mixture was mixed using the mixer at 2,000 rpm for two minutes, resulting in a moldable, cohesive sand-like solid. Then, 10.3 grams of additional water was added to the solid mixture, along with 8 alumina agates to eliminate any agglomerated solids. The sample was mixed using the mixer at 2,000 rpm for two minutes resulting in a viscous, pourable white slurry. In other embodiments, the organic binder solution may include methyl cellulose and/or methyl cellulose derivatives.

The resulting slurry was added to a fractal-type 3D printed plastic mold, such as the mold 302 in FIG. 3A, while vibrating the structure on a vibration table for fifteen minutes to degas and densify (e.g., vibration procedure that serves to compact the slurry material, and bring solid particles closer together). The vibration of the slurry is performed to remove trapped air bubbles in the mixture by bringing the air bubbles to the top of slurry. The sample was air dry overnight in the mold in an oven at 80° C. The sample and mold were then dried at 120° C. for ten hours. For example, samples may be gently dried at a temperature, such as 80° C., which is lower than the boiling point temperature of water (e.g., 120° C.) for twelve to sixteen hours. This method is performed in a manner to remove the water slowly. Once dried, the sample and mold were removed from the oven and the plastic walls were removed from the mold. The exposed walls of 3A/$SiO_2$ were smooth and crack-free. The plastic mold base remained attached to 3A/$SiO_2$ structure. The structure was then calcined to 500° C. using a programmable furnace. The sample was exposed to temperatures around 120° C. for six hours, exposed to temperatures increasing from 120° C. to 350° C. for in ten hours, thermally soaked at 350° C. for four hours to decompose the plastic mold, exposed to temperatures increasing from 350° C. to 500° C. for six hours, thermally soaked at 500° C. for six hours, and then cooled to 120° C. Following calcination process, the resulting self-supporting structure has a weight of 121.283 grams of 70:30 w/w 3A/$SiO_2$. The self-supporting structure had a fractal-type geometric form (e.g., FIG. 3C), with dimensions of 2.25 inch width by 2 in length. The surfaces of the structure were in very good condition, with only some minor hair-line cracks in the top of the structure.

Figure 9:
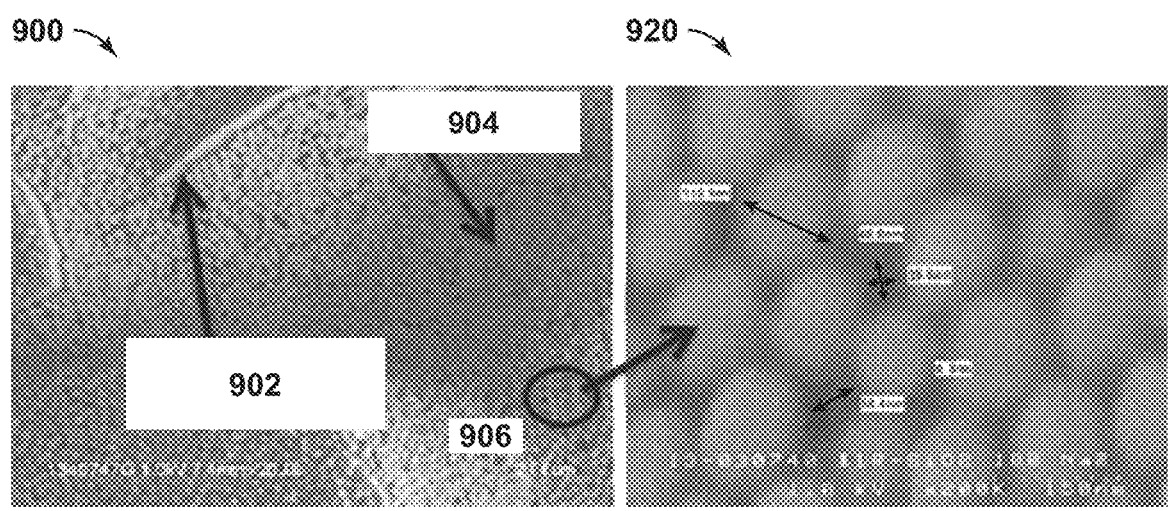
FIG. 9 is an exemplary SEM diagram of a self-supporting structure.

Various SEM images of a self-supporting structure is shown in FIG. 9. FIG. 9 is exemplary SEM diagrams 900 and 920 of the self-supporting structure. In these diagrams 900 and 920, the self-supporting structure is calcined ZSM 58/$SiO_2$ 100 nm (70:30 w/w), which shows high temperature binding. In diagram 900, the edge of a zeolite particle is shown by the light line indicated by arrow 902, while the $SiO_2$ particles are shown by 904. Further, as indicated by region 906, which is expanded into the diagram 920, various 100 nm $SiO_2$ spheres.

SEM diagrams 900 and 920 in FIG. 9 show that smaller 100 nm $SiO_2$ spheres act as an inorganic particle glue to bind the 20 micron diameter zeolite particles together into a cohesive composite of zeolite and $SiO_2$ particles after 500° C. calcination. The $SiO_2$ binder particles are too large to enter the zeolite pores, but small enough to form a dense-packed surface layer on the much larger (e.g., 15 μm to 20 μm) zeolite crystals. High temperature calcination (500° C. to 800° C.) sinters the zeolite and inorganic particles together to form a connected solid network that is still porous. The 30 nm to 50 nm diameter space (pores) between the spherical binder particles is large enough for reactant gases to access the zeolite particles where catalytic and/or separation processes can occur.

Colloidal silicas, when used as binders for adsorbent or catalyst powders, are a very weak bonding agent at low temperatures. However, the bonding strength of the Colloidal silicas increase dramatically with 500° C. to 800° C. calcination temperatures, if there are enough silica particles to make point-to-point contact and also bridge the interstitial spaces between the larger adsorbent particles, as shown in FIG. 9. During drying, prior to the 500° C. to 800° C. calcination process, the slurry shrinks during water loss and the adsorbent particles are pulled closer together, surrounded by a thin layer of $SiO_2$ particles.

Figure 10A:
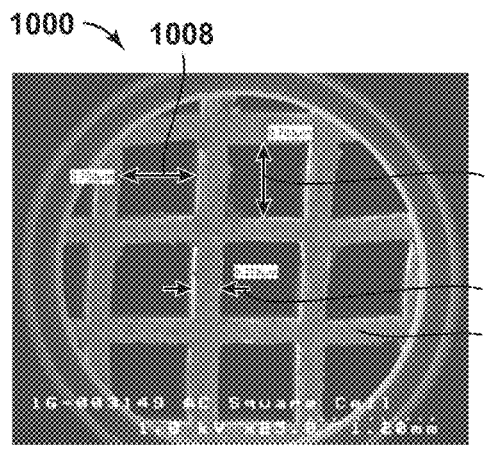
FIGS. 10A and 10B are exemplary SEM diagrams of a self-supporting structure.
Figure 10B:
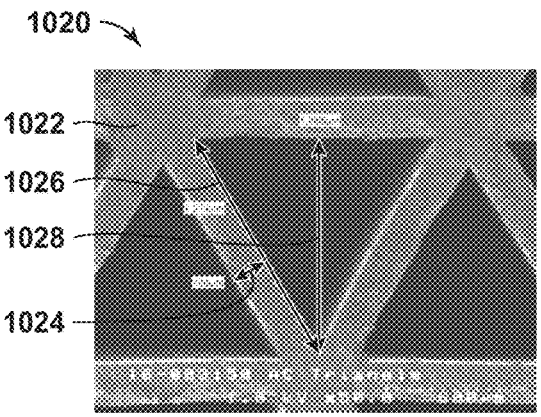

As another example, SEM images of a self-supporting structure is shown in FIGS. 10A and 10B. FIGS. 10A and 10B are exemplary SEM diagrams 1000 and 1020 of a self-supporting structure. In these diagrams 1000 and 1020, the self-supporting structures are monoliths, such as monolith 1002 in diagram 1000 and monolith 1022 in diagram 1020. These monoliths 1002 and 1022 are 5A/$SiO_2$ 25 nm (70:30 w/w) extruded monoliths (e.g., include 70 wt. % active 5A zeolite and 30 wt. % $SiO_2$ binder, which are 25 nm diameter $SiO_2$ particles). The diagram 1000 in FIG. 10A has the square cell structure from FIG. 7B, while the diagram 1020 in FIG. 10B has the triangular cell structure from FIG. 7A. The two monoliths, a square-celled monolith 1002 and a triangular-celled monolith 1022, were extruded using the same formulation that was used to produce the intrusion structures above that utilized 3D printed molds. The monoliths were calcined to 750° C. The square-celled monolith 1002 has cell wall thickness 1004 of about 280 μm, and the square-shaped channels are approximately 700 μm by 700 μm. Specifically, the square-shaped channels have a cell length 1006 of 700 μm and cell width 1008 of 700 μm. The resulting structure yields a cell density of approximately 650 cells per square inch (cpsi). The triangular-celled monolith 1022 has cell wall thickness 1024 of about 200 µm, a side length 1026 of about 1.274 µm and a height 1028 of about 1,060 µm.

In this example, the same formulation utilized to produce a self-supporting structure having custom and complex geometries for the flow passages or channels, as shown in monoliths 1002 and 1022, was also applied to a ceramic extrusion method to produce active material monoliths instead of inactive ceramic monoliths. The resulting structure may be an open-celled structure configured to provide predefined channels for fluid flow paths through the respective monoliths 1002 and 1022.

Extruded ceramic monoliths involve very high "firing" temperatures (e.g., 1,200° C. to 1,500° C.) to achieve mechanical strength. After firing, these ceramic monoliths are typically used as inert support structure (e.g., inorganic support material or inactive support material with the streams passing through the monolith or the environmental conditions the monolith is exposed to during operations). These monoliths, after firing, are usually post-coated with a thin layer of active material. So, the purpose of the ceramic monolith is to act as a substrate/support that provides mechanical strength for the active coating. The ceramic monolith structure, because of its open channel geometry, provides laminar flow and low pressure drop.

The extruded active material monoliths formed by the present techniques are made to be formed from 70% by weight of active material, calcined to much lower temperatures than ceramics (e.g., calcined to 500° C. to 650° C.). The lower temperatures are utilized to maintain activity of the zeolite. The strength for the resulting self-supporting structures is provided by the inorganic $SiO_2$ and/or clay binders. However, the self-supporting structures, while mechanically stable, are not nearly as strong as ceramic monoliths. While clay may be used as a binder for zeolites, it does not provide the strength of sintered $SiO_2$.

Figure 11:
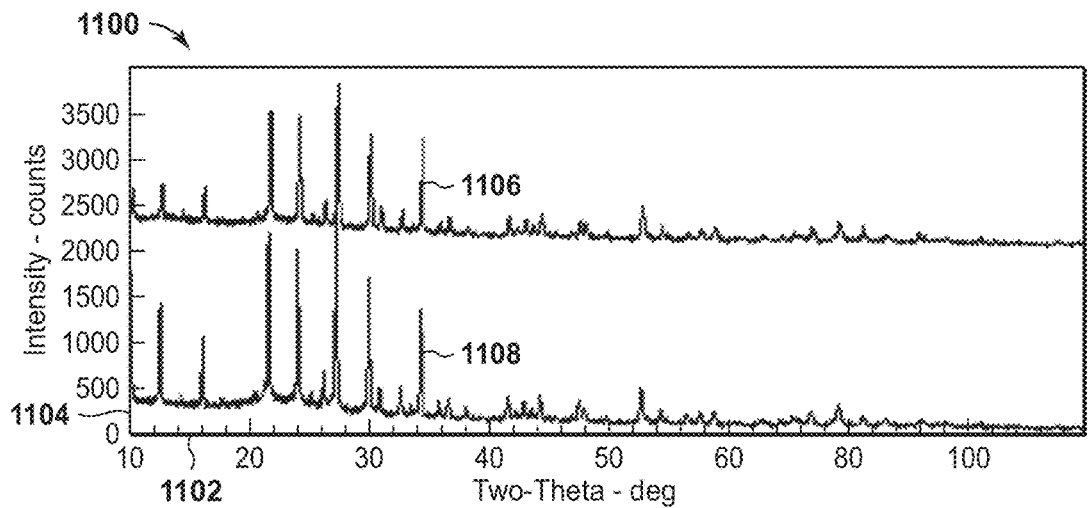
FIG. 11 is an exemplary diagram of overlay patterns that match 5A zeolites.

FIG. 11 is an exemplary diagram 1100 of powder x-ray diffraction overlay patterns 1106 and 1108 of samples from inner and outer walls of extruded $5A/SiO_2$ monoliths that match 5A zeolites. As shown in this diagram 1100, the 5A zeolite structure survived the extrusion and calcination method and the outer co-extruded wall and inner cells are the same formulation. The patterns 1106 and 1108 of the interior cells and exterior wall of the sample indicate that the material in the interior walls and exterior walls is the substantially similar, which are shown along a two-theta axis 1102 in degrees (deg) against intensity counts axis 1104.

As a selection for the active material, the zeolite type A (e.g., LTA structures), such as 3A, 4A and/or 5A, are highly porous adsorbents that have a high affinity and high capacity to adsorb water, as well as other molecules that have dimensions small enough to fit into the uniform pores of these structures. Accordingly, processes that involve drying and purification of gases and liquids rely on the adsorption capacity and efficiency of LTA-type zeolites, such as swing adsorption methods. These 3A, 4A, 5A LTA-type zeolites have the ability to readily adsorb water over a wide range of conditions. They also release the adsorbed water when heated, without the zeolite structure degrading. Thus, they have the ability to cycle between releasing water when heated and readsorbing water upon cooling.

The use of 3A in water desorption is shown in relation to a thermogravimetric analysis (TGA). The TGA was performed by starting with a 3A zeolite powder without binder additives. The TGA experiment yields data on weight loss to the sample versus temperature, as shown in FIG. 12.

Figure 12:
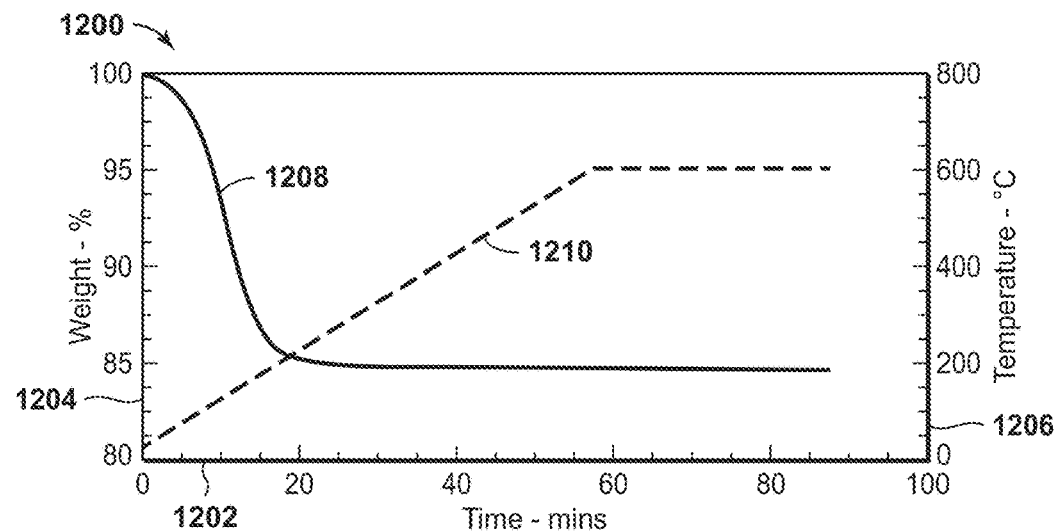
FIG. 12 is a diagram of the weight loss for 3A, due to loss of adsorbed water, as a function of temperature.

FIG. 12 is a diagram 1200 of the weight loss for 3A, due to loss of adsorbed water, as a function of temperature. In this diagram 1200, a first response 1208 and a second response 1210 are shown along a time axis 1202 in minutes (min), a weight percentage axis 1204 in percent and a temperature axis 1206 in ° C. The sample was heated in air from 30° C. to 600° C., at a rate of 10° C. per minute, as shown along the second response 1210. The first response 1208 represents a total weight loss of 15.3%, indicating that the 3A powder had adsorbed 15.3% by weight of water at ambient conditions. The adsorbed water was removed from the sample at 280° C. (e.g., 25 minutes times 10° C./minute plus 30° C. starting temperature).

Further enhancements may be described by comparing $H_2O$ desorption in 3A powder with $H_2O$ adsorption in a 500° C. calcined $3A/SiO_2$ intrusion structure. As noted below, Table 1 compares the water adsorption in a calcined $3A/SiO_2$ (e.g., 70:30 w/w) structure, to the water desorption results in response 1208 of FIG. 12 on the 3A powder.

TABLE 1

| $3A/SiO_2$ structure wt. after 500° C. (grams) | 3A wt. (%) in $3A/SiO_2$ structure | 3A wt. calcd. (grams) | $SiO2$ wt calcd (grams) | Structure wt. after 3 days RT (grams) | Wt increase due to $H_2O$ uptake (grams) | Wt. % increase in $3A/SiO_2$ structure | 3A in structure (dry, 500° C.) + $H_2O$ uptake (grams) | 3A wt. % increase due to $H_2O$ uptake (%) | 3A powder TGA result (above) wt. loss due to $H_2O$ desorption (%) | Agreement between TGA wt. loss and structure $H_2O$ uptake (% of agreement) |
|---|---|---|---|---|---|---|---|---|---|---|
| 20.560 | 70% | 14.392 | 6.168 | 22.837 | 2.217 | 11.07% | 16.609 | 15.4% | 15.3% | 993% |

In Table 1, the $3A/SiO_2$ structure used in the comparison is similar to that in FIG. 2C, which is a 70:30 w/w $3A:SiO_2$ laminar sheet monolith obtained by the method described above. The structure was calcined to 500° C. to decompose the 3D printed plastic mold and organic binder and sinter the 3A and $Si_{O2}$ 25 nm particles together. The $3A/SiO_2$ laminar sheet structure was stored in a 120° C. furnace, after 500° C. calcination process. The 3A component of the structure was expected to have no adsorbed water. The $3A/SiO_2$ structure, which is 1 inch d by 2 inch length, was weighed at 120° C. from the furnace and its weight, as recorded in Table 1 was 20.560 grams, which has 70% of the 20.560 gram total weight, or 14.392 grams is the 3A component. The remaining 30% of the 20.560 grams of total weight, or 6.168 grams, is the 25 nm diameter $SiO_2$ binder particles.

After weighing the $3A/SiO_2$ structure devoid of water ($H_2O$), the structure was exposed on a lab bench for seventy-two hours to ambient conditions. After seventy-two hours of being exposed to ambient conditions, the $3A/SiO_2$ structure was re-weighed, and its weight was 22.837 grams. This increase in weight was 11.07%, which is a result of adsorbing 2.217 grams of water from the ambient air. The majority of the water could only be adsorbed by the 3A component in the 3A/SiO$_2$ structure. When determining the water uptake for the 3A component of the structure, it corresponds to a 15.4% weight increase. This weight increase is similar to the 15.3% weight loss in 3A powder, due to water desorption in response 1210 of FIG. 12. As a result, the weight increase in the 3A/SiO$_2$ laminar sheet structure indicates that the 3A component in the structure is accessible to the water molecules, but this ambient moisture test does not provide information about the rate of access.

In recent tests, the rate of access to 3A, by adsorbing gas molecules, may be hindered by the 25 nm SiO$_2$ binder, especially at elevated calcination temperatures (700 C+). Accordingly, the method may include adjustments to the binder to enhance access to the pores.

For examples, the 3A component in the 3A/SiO$_2$ structure is porous. The "windows" or pores of the 3A structure have openings of 3 angstroms size. Water molecules have a diameter of about 2.8 angstroms and may fit into the 3A structure or "adsorbed" to the inside of the 3A structure. The SiO$_2$ binder is non-porous. The SiO$_2$ spheres do not have pores and thus, do not adsorb water into its structure. The water can wet the surface of the SiO$_2$ spheres, but that amount of water may be a very small fraction of the total amount of water that could be adsorbed by a 3A zeolite (70 wt. %)/SiO$_2$ (30 wt. %) structure. Thus, the 3A zeolite component is the primary material to adsorb water in the 3A/SiO$_2$ composite structure. TGA (thermal gravimetric analysis) measures weight loss versus temperature. FIG. 12 is the TGA analysis of 3A zeolite only. It shows that the 3A powder lost 15.3% of weight, which is due to desorbing the water that it adsorbed under ambient conditions.

From the example above, this TGA result on 3A zeolite powder is approximately equal to the 15.4% weight gain in the 3A/SiO$_2$ structure in the example due to adsorption of water under ambient conditions. The nearly identical TGA desorption (weight loss) result and adsorption (weight gain) result in the 3A/SiO$_2$ structure shows that the 3A zeolite component was accessible to the water.

As an additional enhancement, gas adsorption break-through test were also performed on the self-supporting structures. A gas adsorption break-through unit, which is referred to as NatGas Unit, was used to measure gas adsorption and break-through profiles of coated substrates. A sample of known weight is wrapped to prevent gas bypass and inserted into a tube in the gas adsorption break-through unit. The samples are exposed to a total 1,000 standard cubic centimeters per minute (sccm) gas flow rate, comprised of 300 sccm N$_2$ saturated with H$_2$O at 25° C., 100 sccm He and 600 sccm N$_2$. The gas break-through is monitored by a mass spectrometry. The gas flow measurement term of sccm represents cm3/min at standard temperature and pressure.

As part of this testing, an aqueous slurry with 35 wt. % solids, comprised of 3A/SiO$_2$ (70:30) and methyl cellulose (temporary organic binder), was formulated, as described above in the example 3A/SiO$_2$ slurry preparation. The slurry was applied to an Al$_2$O$_3$ ceramic monolith, which has dimensions suitable for testing in the gas adsorption break-through unit. The washcoat on the ceramic monolith had a similar composition to the self-supported structures after calcination. Thus, the 3A/SiO$_2$ washcoated monolith was used as a suitable surrogate for the self-supporting intrusion and extrusion structures and, hence, breakthrough results should be and are expected to be comparable.

In this testing, the 900 cpsi Al$_2$O$_3$ monoliths had dimensions of 0.5 inch d by 1 inch L, 30% wall porosity and 55% open frontal area. The starting, uncoated weight of the monolith was 4.099 gram. Two coatings of the slurry were applied by conventional washcoating techniques and the sample was dried and calcined to 500° C. The sample weight after calcination was 4.893 grams. The resulting 3A/SiO$_2$ (25 nm d) washcoated monolith contained approximately 0.556 gram of 3A adsorbent and was a representative sample for formulations used in self-supporting intrusion and extrusion structures. Prior to break-through testing, the 3A/SiO$_2$ coated monolith was dried for twelve hours at 150° C. and 100 sccm He flow.

Figure 13A:
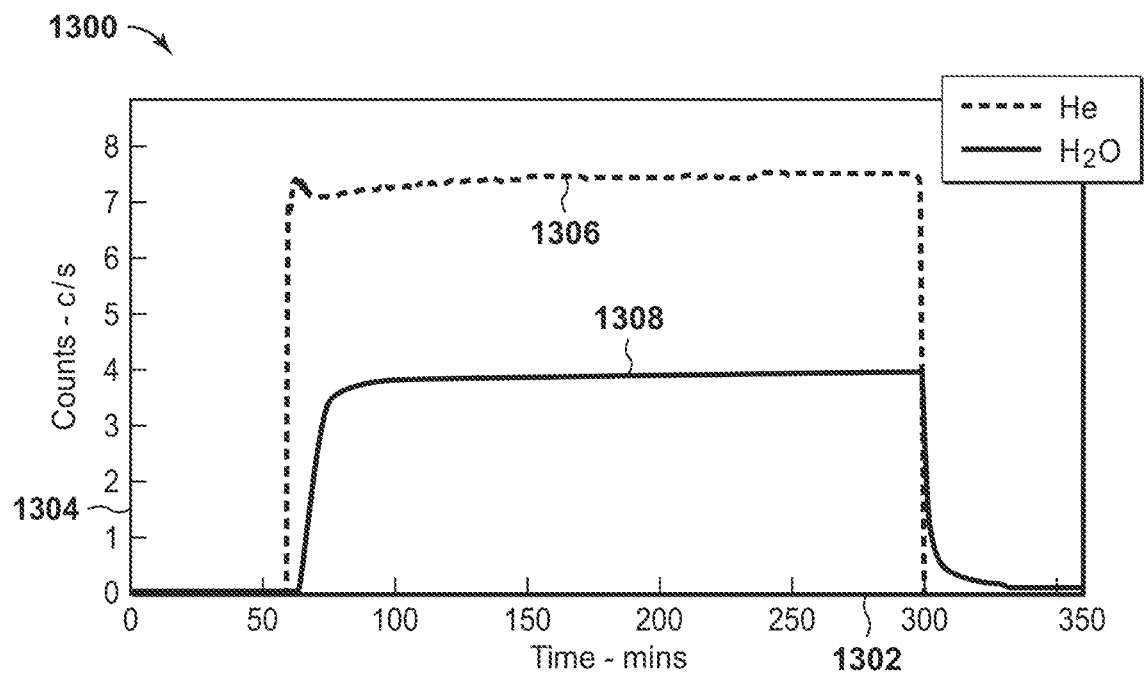
FIGS. 13A to 13D are diagrams of various profiles.
Figure 13B:
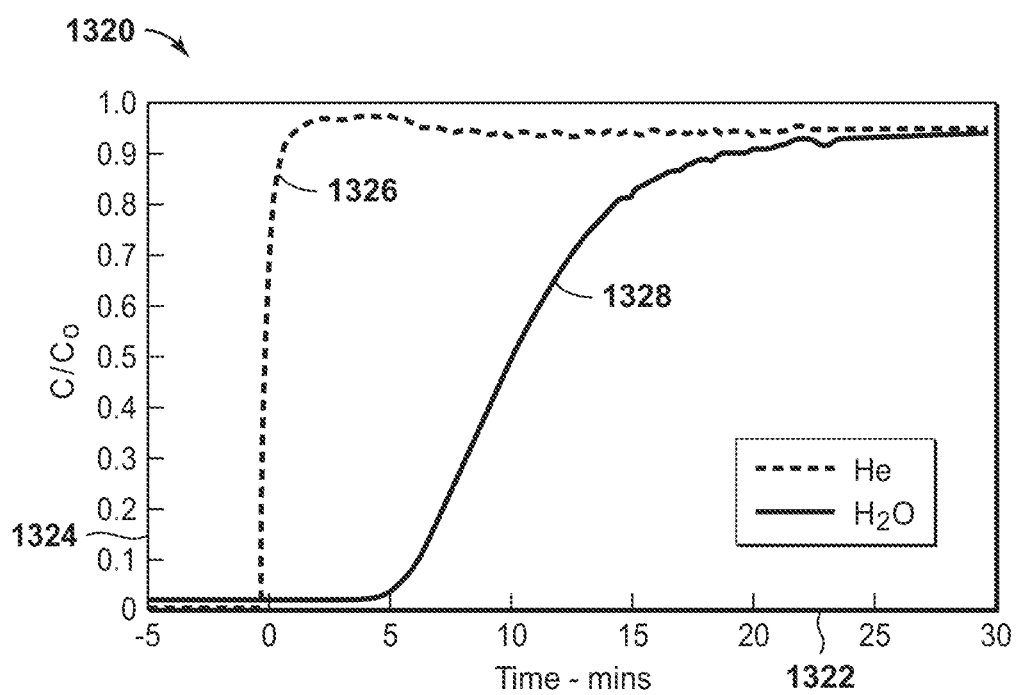

FIGS. 13A and 13B are diagrams 1300 and 1320 of break-through profiles. The breakthrough profile is reasonably sharp. In FIG. 13A, the He response 1306 and H$_2$O response 1308 are shown along a time axis 1302 in minutes versus a mass spectrometer axis 1304 in counts per second to water. The estimated rate of water feed is 5.48 milligrams (mg) per minutes (min). The estimated time for 0.55 grams of 3A in the 3A/SiO$_2$ washcoat to adsorb water before break-through is 25 minutes (e.g., 30 minutes at uptake level off minus 5 minutes at beginning of uptake). The response 1306 represents a blank trace (e.g., no sample), which from time 0 to 50 minutes of dry He purge and the response 1306 is flat and near the baseline, indicating no counts for H$_2$O. Then, after 50 minutes, the valve switches to feed humidified stream, which may be primary a nitrogen stream N$_2$. The response 1306 rises vertically as the mass spectrometer shows increasing counts per second of H$_2$O, until the H$_2$O is removed at 300 minutes. Then, the response 1306 returns to the baseline indicating no counts of H$_2$O. The response 1308 shows a shows a similar experiment through a sample of 3A/SiO$_2$ coated onto Al$_2$O$_3$ ceramic monolith. As indicated by this response 1308, it is about 5 minutes longer for the response 1308 to rise as compared to the response 1306 for the blank sample, which indicates that H$_2$O breakthrough is being slowed by the adsorption of H$_2$O in the 3A component until the sample reaches water saturation and equilibrium.

In FIG. 13B, the He response 1326 and H$_2$O response 1328 are shown along a time axis 1322 in minutes versus a normalized fractional concentration of H$_2$O axis 1324 in C/Co, which expresses the normalized fractional concentration of H$_2$O being measured by a mass spectrometer as a function of time axis 1322. In this diagram 1320, the 3A adsorbs water for about 25 minutes, indicating that the 3A adsorbent particles are accessible without signs of major diffusional hindrance. The response 1326 represents a dry He purge passing through an empty cell for 5 minutes, which is flat and near the baseline. Once a valve is switched to feed humidified He stream, the mass spectrometer indicates a breakthrough of the Helium (He) at time 0 minutes. In comparison, the response 1328 represents a sample cell with 3A/SiO$_2$ washcoated ceramic monolith responding to a humidified He flow. The response 1328 indicates the normalized H$_2$O concentration versus time. Accordingly, it indicates that it takes several minutes (e.g., about 25 minutes) until the 3A component in the sample is saturated with H$_2$O and the full concentration (100%) of H$_2$O is indicated by the mass spectrometer.

Figure 13C:
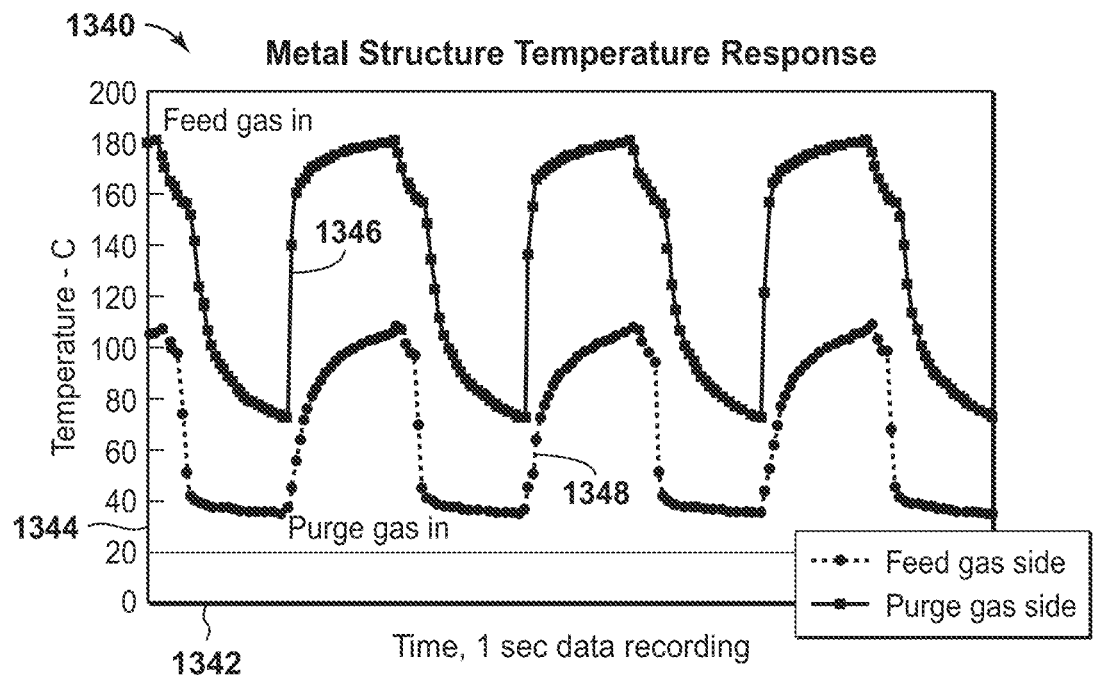
Figure 13D:
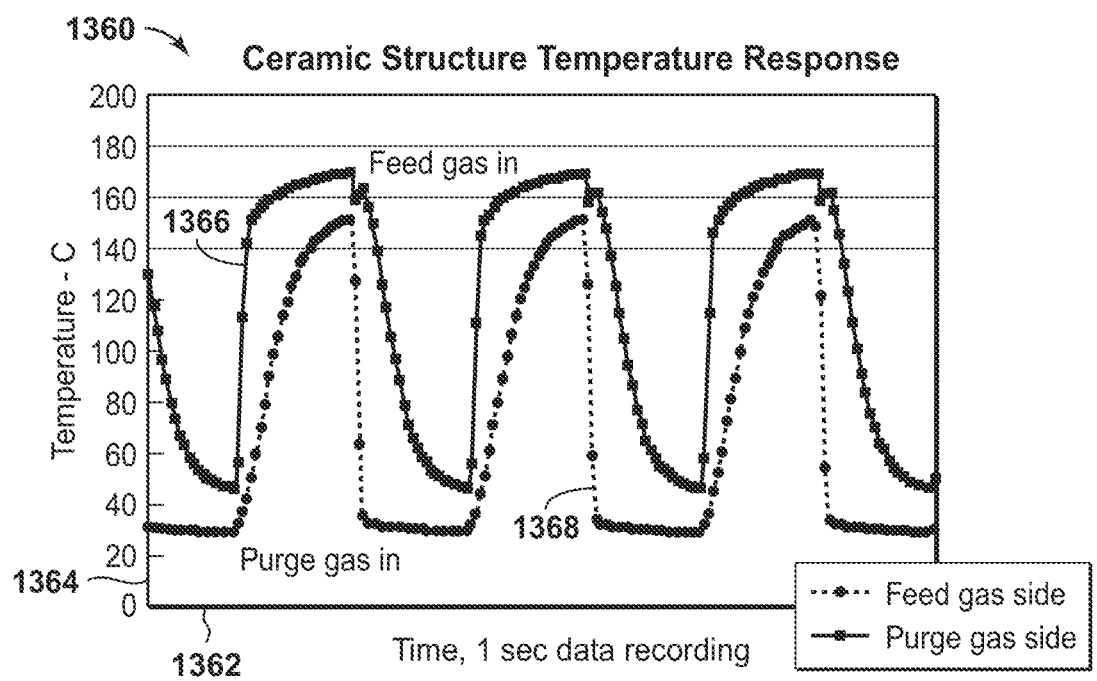

FIGS. 13C and 13D are diagrams 1340 and 1360 of transition feed versus purge temperature profiles. In this diagrams 1340 and 1360, ceramic monoliths perform significantly better to thermal transitions than the metal monoliths. The ceramic materials should perform similar to the self-supported active structures, which have a low thermal mass structures similar to ceramics and should exhibit similar thermal swing advantages. Further, the self-supported structures of the present techniques are composed of a majority of active material, which is the material that the thermal swing process is attempting heat and cool rapidly.

In the diagrams 1340 and 1360, a cyclic process was used that involved fluid flows for 20 seconds each for feed and purge steps of the cycle. The gas flow rates were 14 standard cubic feet per minute (scfm) for feed gas and 22 scfm for purge gas. Nitrogen gas was used for feed and purge streams, which were introduced at opposite ends of the monoliths or bed. The feed stream was at ambient temperature, while the purge stream was at 180° C. To monitor the temperature, fast response thermocouples were used to measure and store the temperatures, which had a first thermocouple positioned to measure temperatures at the feed gas inlet side of the structure and a second thermocouple positioned to measure temperatures at the purge gas inlet side of feed gas.

In FIG. 13C, the temperature responses 1346 and 1348 are shown along a time axis 1342 in seconds versus a temperature axis 1344 in ° C. The metal monolith used as a sample bed were three monoliths of 0.75 inches in diameter by 2 inches in length, made of stainless steel, with cell density greater than 1,000 cell per square inch (cpsi), with 50 micron thick cell walls and a center steel arbor of ⅜ inch diameter. The monolith cells were coated with thin layer of adsorbent and the monoliths were wrapped with fibrous insulation to prevent gas bypass. The resulting structure was loaded into a sample tube. The diagram 1340 with temperature responses 1346 and 1348 for the metal monoliths indicate a large temperature gap of approximately 70° C. in responding to temperature transitions between 180° C. purge gas and ambient temperature feed gas. This indicates that the metal monolith is adsorbing significant heat into the structure.

In FIG. 13D, the temperature responses 1366 and 1368 are shown along a time axis 1362 in seconds versus a temperature axis 1364 in ° C. The ceramic monolith used as a sample bed includes the monoliths of 0.75 inch diameter and 2 inch length, made of alumina ceramic, with cell density of 900 cpsi, with 100 micron thick cell walls, no center arbor. Ceramic monoliths were wrapped with fibrous insulation to prevent gas bypass. The resulting structure was loaded into a sample tube. The diagram 1360 with the temperature responses 1366 and 1368 for the alumina ceramic monoliths indicate that the temperature transitions during the temperature cycle has a smaller temperature change than the metal monolith, as shown in FIG. 13C. The temperature gap in the responses 1366 and 1368 for the ceramic monoliths is approximately 20° C. during cycling process. This indicates that the ceramic monoliths adsorb less heat into the structure than the metal monoliths, as shown in FIG. 13C.

Testing may be performed on the self-supporting structure. For example, an ambient air exposure test may be performed, which is a passive test. There is no driving force to add water to the 3A/SiO$_2$ structure. It slowly adsorbs water from the air and it is affected by conditions of relative humidity and temperature, which are measured. This test delivers a calibrated flow of gas in sccm with known concentration of water and monitors the time until the 3A/SiO$_2$ structure has adsorbed water to its capacity. There is a mass spectrometer instrument monitoring the exit gas stream from the structure. The mass spectrometer instrument is monitoring water in the gas versus time. When water is detected, which is referred to as "breakthrough", it indicates that the 3A component of structures is saturated with water at these specific conditions and cannot adsorb more water.

As yet another example, the self-supporting structure may be formed through an extrusion process. For example, a mixture may be formed into a monolith form comprising defined channels (e.g., substantially parallel channels), separated by thin walls, wherein the mixture has greater than 50% by weight of the active material in the self-supporting structure and the remaining mixture includes binder material. Then, the monolith form may be dried and the monolith form may be calcined within a temperature range between 400° C. and 800° C. to form a mechanically stable, active monolith form. The monolith form may include the defined channels have a cross sectional shape (e.g., cross sectional shape that is along a plane that is perpendicular to direction of primary flow through the respective channel) that may be a square, a circle, a triangular, a hexagonal or any other suitable shape. The cell density of the monolith form may be in a range between 200 cells per square inch and 2,000 cells per square inch. The walls separating the channels may have a thickness in the range between 40 micron and 1 millimeter.

Once formed, the monolith form, which is the self-supporting structure, may be disposed within a housing of a processing unit having an interior region. The housing may have a plurality of valve ports created into the housing (e.g., drilled or formed into the housing); and valves may be secured to the housing in each of the valve ports to form the valves, wherein each of the valves is configured to control fluid flow between the self-supporting structure and a location external to the housing.

In certain configurations, the present techniques may be utilized in a swing adsorption method (e.g., a rapid cycle process) for the removal of one of more contaminants from a feed stream. In particular, the present techniques involve a one or more adsorbent bed units to perform a swing adsorption method or groups of adsorbent bed unit configured to perform a series of swing adsorption methods. Each adsorbent bed unit is configured to perform a specific cycle, which may include an adsorption step and a regeneration step. By way of example, the steps may include one or more feed steps, one or more depressurization steps, one or more purge steps, one or more recycle steps, and one or more re-pressurization steps. The adsorption step may involve passing a feed stream through the adsorbent bed to remove contaminants from the feed stream. The regeneration step may include one or more purge steps, one or more blow-down steps, one or more heating steps and/or one or more repressurization steps.

The present techniques may also include active materials that are configured to perform at various operating conditions. For example, the feed pressure may be based on the preferred adsorption feed pressure, which may be in the range from 400 pounds per square inch absolute (psia) to 1,400 psia, or in the range from 600 psia to 1,200 psia. Also, the purge pressure may be based on the sales pipeline pressure, which may be in the range from 400 psia to 1,400 psia, in the range from 600 psia to 1,200 psia.

In addition, other configurations may involve enhancements for adsorption structures that may be formed primarily from active component. Beneficially, the use of primarily active components may provide significantly cheaper, higher working capacity potential in smaller volume, cell uniformity, increased geometric and engineering flexibility, and/or lower thermal mass. For example, the self-supporting structures may be formed into self-supporting structure monoliths, self-supporting 3D structures (e.g., indirect from 3D printing), and/or self-supporting structure foams. The self-supporting structure monoliths may be preferred for applications, such as pressure swing adsorption, which involves low pressure drop.

By way of example, the compositions of the self-supporting structure monoliths may include thin films that are used with natural gas stream, which indicate that the compositions are beneficial. One configuration includes extruded self-supporting structure monoliths. This configuration may lack a preferred breakthrough front because gas diffusion hindrance issues and/or damaged adsorbent crystals.

Figure 14:
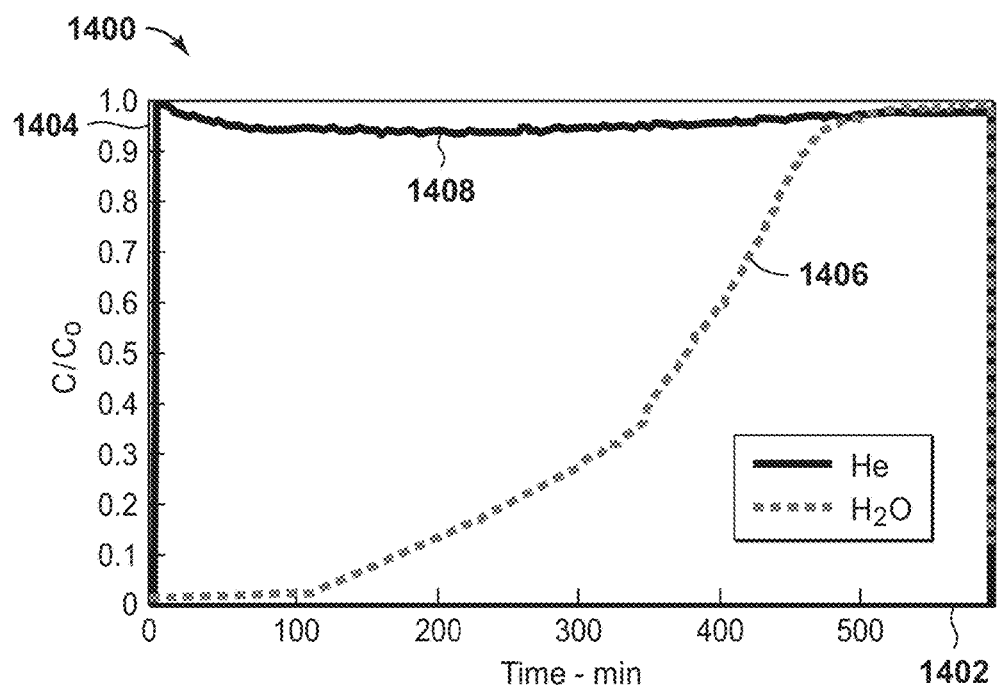
FIG. 14 is an exemplary diagram of self-supporting structure monolith testing.

FIG. 14 is an exemplary diagram 1400 of self-supporting structure monolith test results. As shown in FIG. 14, an extruded self-supporting structure monolith may be formed of a composition of $5A/SiO_2$ to 25 nm (70:30) and may be calcinated at 750° C. As shown in the diagram 1400, a plot of a natural gas test is shown. In the diagram 1400, a first response 1408 of Helium and a second response 1406 of Water ($H_2O$) are shown along a time axis 1402 in minutes (min) and a normalized fractional concentration of $H_2O$ axis 1404 in normalized concentration (C/Co). The first response 1408 is a breakthrough curve increases at an angle to the right, which may preferably be vertical. Gas permeance testing may be performed to determine if extrusion pressures (e.g., 2000 pounds per square inch gauge (psig) to 4,000 psig) needed to form self-supported extruded monoliths, have diminished the macro pore system, thus increasing diffusional hindrance. Similarly, a $H_2O$ breakthrough test may be performed to determine whether the extrusion pressure damaged the adsorbent crystals. This testing may include using the same sample and/or the sample holder, which may be performed after gas permeance test completed. The gas permeance testing, may involve using a carver press to compress disks of self-supporting structures monoliths compositions to 5,000 psig to simulate monolith extrusion pressures.

In one or more configurations, measurements of the effects on gas permeance are obtained in disk structures of self-supporting structure monolith compositions. For example, the effects on gas permeance may be compared with extrusion-type pressures, such as disks compressed to 5,000 psig before drying and/or calcination or may be compared with various polyethylene sphere additives. The gas permeation results indicate that a method of using polyethylene spheres as an approach to enhance gas transport in self-supported compositions, appears to be effective. The effects of macro-pore additive may include greater impact with smaller (e.g., 25 nm) binder system than in 100 nm binder system. The larger effect on average pore size of 25 nm binder system is enhanced because 25 nm particles (e.g., 25 nm $SiO_2$ particles) are smaller than 100 nm particles (e.g., 100 nm $SiO_2$ particles) and there are more 25 nm particles for same composition of $5A/SiO_2$ w/w ratio than 100 nm particles. By way of example, the self-supported structures may utilize pore engineering methods, which may involve using polyethylene spheres. The adsorbent (e.g., 5A) may be a combination of macro-pore additives (polyethylene spheres dimensions of 2 to 4 micrometer spherical) and an inorganic binder (e.g., $SiO_2$ particles colloidal solution of 40 weight percent (wt. %) of 25 nm $SiO_2$ or 40 wt. % of 100 nm $SiO_2$.

Figure 15A:
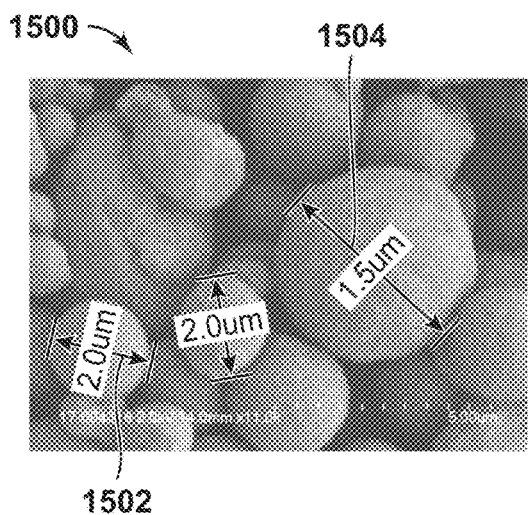
FIGS. 15A and 15B are exemplary diagrams of polyethylene spheres used in self-supporting structure monoliths.
Figure 15B:
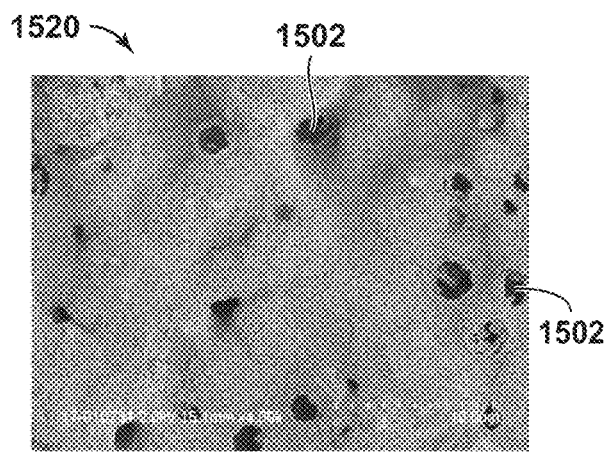

FIGS. 15A and 15B are exemplary diagrams 1500 and 1520 of polyethylene spheres, which may be used in self-supporting structure monoliths. FIG. 15A is a diagram 1500 of spheres, which includes a first diameter 1502 and a second diameter 1504. The first diameter 1502 and second diameter 1504 may be in the range between 2 micrometers and 4 micrometers. FIG. 15B is a diagram 1520 of spherical macro-porous holes after burnout after 500° C. calcination in a $5A/SiO_2$ sample (with 5% polyethylene spheres).

To assess self-supporting structure monolith compositions, testing may be performed to determine porosity (e.g., gas permeance and/or mercury porosimetry testing) and capacity (e.g., $H_2O$ uptake by adsorbent). By way of example, the testing may include gas permeance testing, water uptake testing and mercury porosimetry testing. For the gas permeance testing, the gas permeance is compared with the feed pressure. The probing porosity system of self-supporting structure monolith disks may involve deriving information about permeability, connected porosity, pore diameter, and any combination thereof. The gas permeance configuration of the test unit may include a housing having an interior region configured to hold a disk, a pressure meter at the inlet side of the housing, and a flow meter at the outlet side of the housing. The formulated disks may be compressed to 5,000 psig, which is used to mimic the monolith extrusion pressure in the range between 2,000 psig and 4,000 psig. The gas permeance testing may include passing various streams through the self-supporting structure monolith disks, such as Helium (He) to provide a non-adsorbing trace line and other gases having mass and viscosity (e.g., four other compositions, which are run separately through the disks). These different streams may include Helium (He), Nitrogen ($N_2$), carbon dioxide ($CO_2$), methane ($CH_4$) and Argon (Ar). The gas permeance testing may include measuring the gas pressure on an inlet side of the test unit and measuring the fluid flow on the outlet side of the test unit. The associated measurements provide insights of the open pore system.

In addition, the testing may include water uptake testing, which may be performed after the gas permeance testing. This testing may involve determining $H_2O$ breakthrough. The water uptake testing configuration of the test unit may include a housing having an interior region configured to hold a disk and a humidity sensor at the outlet side of the housing. The water uptake testing may involve probing working capacity of zeolite adsorbent in self-supporting structure monoliths, disks or films. The testing may include 40% relative humidity (RH) water on gas feed side to be used for measuring breakthrough humidity versus time on outlet side. The weight of disk with adsorbent composition is known and is used to calculate and compare breakthrough time. This indicates the amount of the adsorbent (e.g., zeolite) is accessible (e.g., working capacity) as compared to the known amount of adsorbent.

Further still, the testing may include Mercury (Hg) porosimetry testing, which may be performed after the gas permeance testing and water uptake testing. The Hg porosimetry testing may include determining the Hg intrusion. The Hg porosimetry testing configuration of the test unit may include a housing having an interior region configured to hold a disk. The testing may include probing porosity system of the disks using Hg liquid and pressures (e.g., ambient to 60,000 psig). This testing may be used to determine pore diameter and/or pore volume. Portions or pieces of formulated disks may be used in permeance and breakthrough tests are sent to Micromeritics Analytical Services Company for testing.

Various observations are shown in FIGS. 16A to 16D. In particular, FIGS. 16A, 16B, 16C and 16D are exemplary diagrams 1600, 1620, 1640 and 1660 of a permeance measurements in accordance with embodiments of the present techniques. In these diagrams 1600, 1620, 1640 and 1660, the gas permeances of extrusion-type samples tested are high (e.g., $10^{e-6}$ to $10^{e-5}$ moles/s m2 Pa). The self-supporting structure monolith disks have a composition that is an adsorbent zeolite to $SiO_2$ (e.g., 25 nm) binder having about a 80:20 (w/w) ratio. The disks are compressed at 5,000 psig.

Figure 16A:
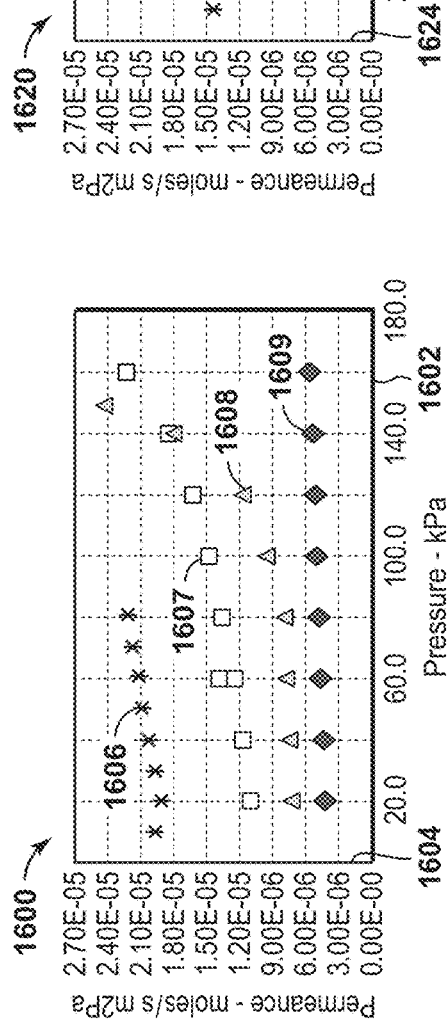
FIGS. 16A to 16D are exemplary diagrams of a permeance measurements in accordance with an embodiment of the present techniques.

FIG. 16A is an exemplary diagram 1600 of permeance measurements for Helium (He) gas passing through the self-supporting structure monolith disks. In this diagram 1600, various response points, such as points 1606, 1607, 1608 and 1609, are shown along a permeance axis 1604 in moles per second meter squared Pascal (moles/s $m^2$ Pa) against a pressure axis 1602 in kilo-Pascal (kPa). In particular, the points, such as points 1606, shown by x's represent the disk made of $5A/SiO_2$ 100 nm having 10% w/w macropore additive before calcination, while the points, such as points 1607, shown by the squares represent the disk made of $5A/SiO_2$ 25 nm having 5% w/w macropore additive before calcination, and the points, such as points 1608, shown by the triangles represent the disk made of $5A/SiO_2$ 100 nm having 0% w/w macropore additive before calcination, and the points, such as points 1609, shown by the diamonds represent the disk made of $5A/SiO_2$ 25 nm having 0% w/w macropore additive before calcination.

Figure 16B:
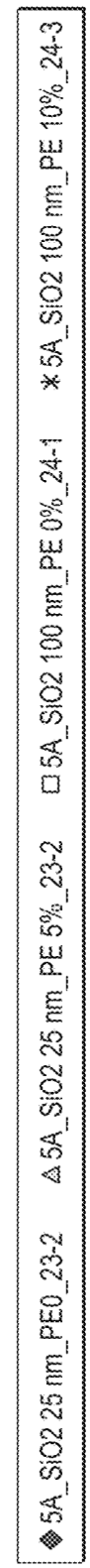

FIG. 16B is an exemplary diagram 1620 of permeance measurements for Nitrogen ($N_2$) gas passing through the self-supporting structure monolith disks. In this diagram 1620, various response points, such as points 1626, 1627, 1628 and 1629, are shown along a permeance axis 1624 in moles per second meter squared Pascal (sm2 Pa) against a pressure axis 1622 in kilo-Pascal (kPa). In particular, the points, such as points 1626, shown by x's represent the disk made of $5A/SiO_2$ 100 nm having 10% w/w macropore additive before calcination, while the points, such as points 1627, shown by the squares represent the disk made of $5A/SiO_2$ 25 nm having 5% w/w macropore additive before calcination, and the points, such as points 1628, shown by the triangles represent the disk made of $5A/SiO_2$ 100 nm having 0% w/w macropore additive before calcination, and the points, such as points 1629, shown by the diamonds represent the disk made of $5A/SiO_2$ 25 nm having 0% w/w macropore additive before calcination.

Figure 16C:
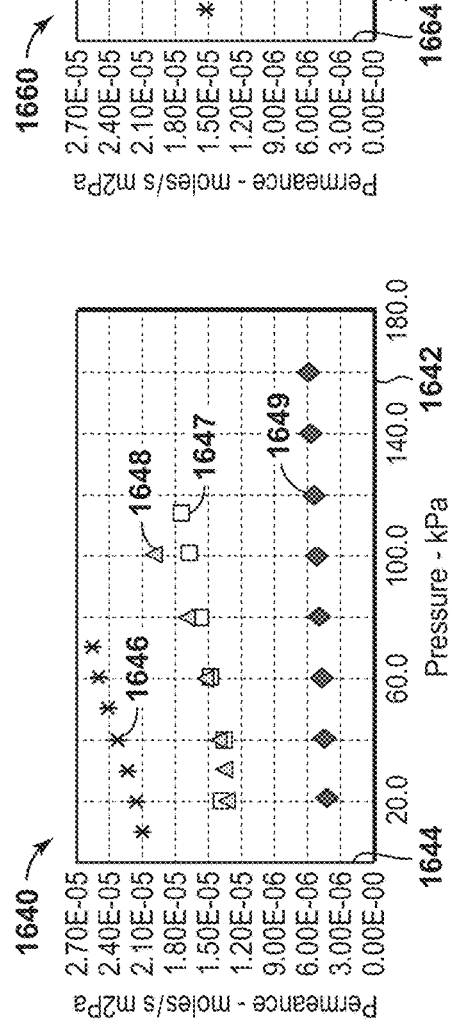

FIG. 16C is an exemplary diagram 1640 of permeance measurements for methane ($CH_4$) gas passing through the self-supporting structure monolith disks. In this diagram 1640, various response points, such as points 1646, 1647, 1648 and 1649, are shown along a permeance axis 1644 in moles per second meter squared Pascal (sm2 Pa) against a pressure axis 1642 in kilo-Pascal (kPa). In particular, the points, such as points 1646, shown by x's represent the disk made of $5A/SiO_2$ 100 nm having 10% w/w macropore additive before calcination, while the points, such as points 1647, shown by the squares represent the disk made of $5A/SiO_2$ 25 nm having 5% w/w macropore additive before calcination, and the points, such as points 1648, shown by the triangles represent the disk made of 5A/SiO2 100 nm having 0% w/w macropore additive before calcination, and the points, such as points 1649, shown by the diamonds represent the disk made of 5A/SiO2 25 nm having 0% w/w macropore additive before calcination.

Figure 16D:
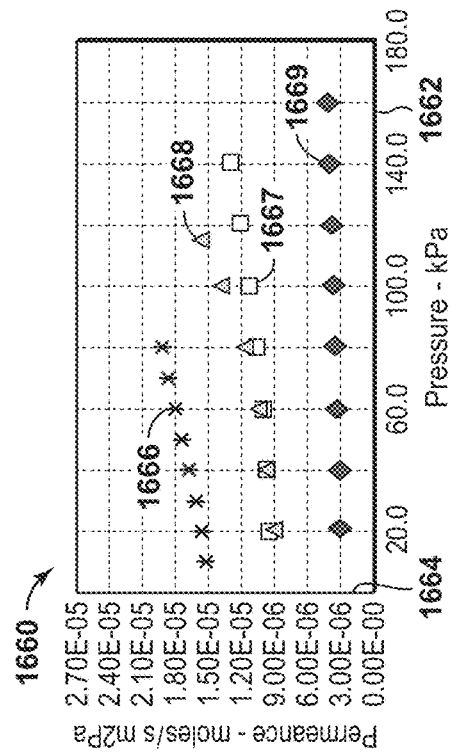

FIG. 16D is an exemplary diagram 1660 of permeance measurements for carbon dioxide ($CO_2$) gas passing through the self-supporting structure monolith disks. In this diagram 1660, various response points, such as points 1666, 1667, 1668 and 1669, are shown along a permeance axis 1664 in moles per second meter squared Pascal (sm2 Pa) against a pressure axis 1662 in kilo-Pascal (kPa). In particular, the points, such as points 1666, shown by x's represent the disk made of $5A/SiO_2$ 100 nm having 10% w/w macropore additive before calcination, while the points, such as points 1667, shown by the squares represent the disk made of $5A/SiO_2$ 25 nm having 5% w/w macropore additive before calcination, and the points, such as points 1668, shown by the triangles represent the disk made of $5A/SiO_2$ 100 nm having 0% w/w macropore additive before calcination, and the points, such as points 1669, shown by the diamonds represent the disk made of $5A/SiO_2$ 25 nm having 0% w/w macropore additive before calcination.

As shown by the diagrams 1600, 1620, 1640 and 1660, the permeance improves between the addition of 0% polyethylene spheres, 5% polyethylene spheres and 10% polyethylene spheres to the composition. Further, the differences between 25 nm binder and 100 nm binder samples are shown in these diagrams 1600, 1620, 1640 and 1660. Accordingly, the addition of 5% polyethylene spheres to disk composition having 25 nm diameter yield similar permeance to disk compositions for 100 nm diameter (100 nm) binder with 0% polyethylene spheres.

Figure 17:
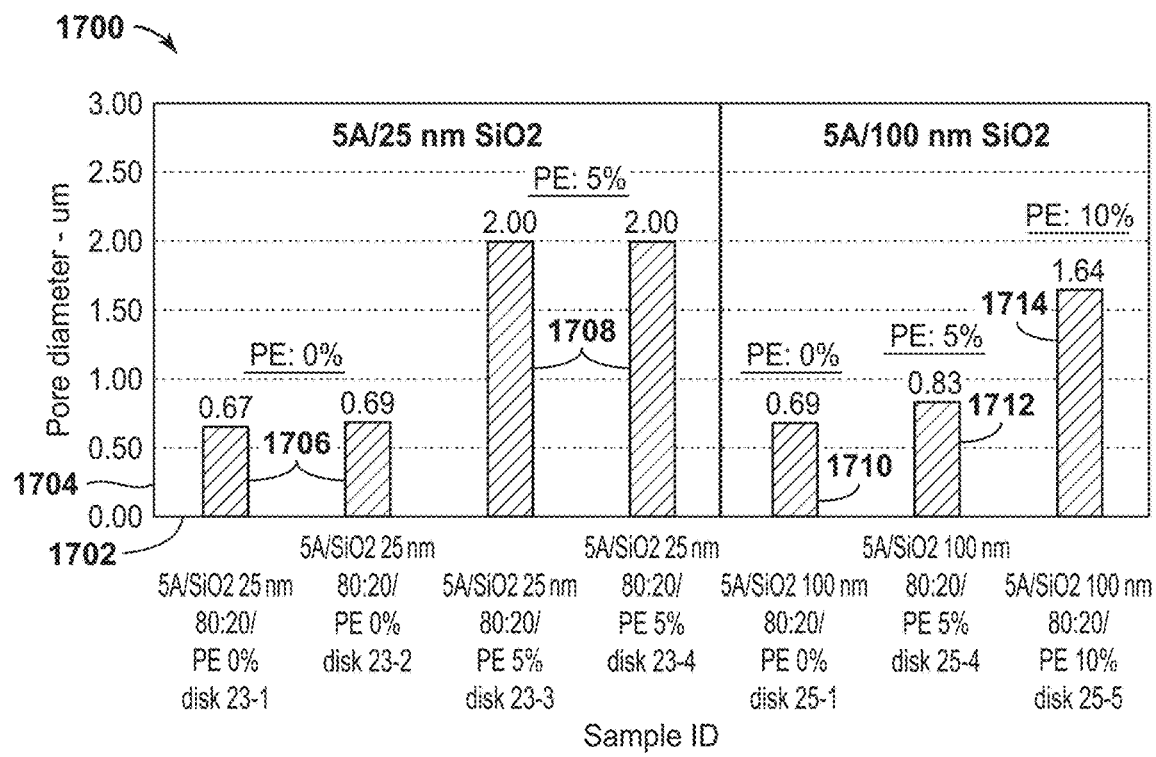
FIG. 17 is an exemplary diagram of average pore diameter based on gas permeance measurements in accordance with an embodiment of the present techniques.

The average pore diameter may be determined from the gas permeance measurements and/or Knudsen and Poiseuille models, as shown in FIG. 17. FIG. 17 is an exemplary diagram 1700 of average pore diameter based on gas permeance measurements in accordance with an embodiment of the present techniques. In the diagram 1700, the effect of the macropore additive in disks for the 25 nm binder material versus 100 nm binder materials. In this diagram 1700, various disks, which have various compositions are shown along a pore diameter axis 1704 in micrometers (μm) against a sample identification (ID) axis 1702. The disk may have a composition of 5A/25 nm $SiO_2$ particles having 0% polyethylene spheres, as shown by response 1706, while the disk may have a composition of 5A/25 nm $SiO_2$ particles having 5% polyethylene spheres, as shown by responses 1708. The disk may have a composition of 5A/100 nm $SiO_2$ particles having 0% polyethylene spheres, as shown by response 1710, while the disk may have a composition of 5A/100 nm $SiO_2$ particles having 5% polyethylene spheres, as shown by responses 1712, and the disk may have a composition of 5A/100 nm $SiO_2$ particles having 10% polyethylene spheres, as shown by responses 1714.

As shown by the responses 1706, 1708, 1710, 1712 and 1714, the average pore diameters may indicate the effects of pore engineering macro-pore additives. In the model, the calculations indicates the average pore diameter sizes between 0.6 micrometers to 2.0 micrometers. The addition of macropore additives have a greater impact on increasing average pore diameters of 5A compositions containing smaller diameter binder materials (e.g., 25 nm) as compared to the larger diameter binder materials (e.g., 100 nm). The larger effect on average pore size of 5A compositions containing smaller diameter binder materials (e.g., 25 nm) is attributed to differences in binder particle diameter sizes (e.g., 25 nm $SiO_2$ particles are smaller than 100 nm $SiO_2$ particles) and/or the larger number of particles for volume (e.g., more 25 nm particles for same $5A/SiO_2$ w/w ratio than 100 nm particles).

Figure 18:
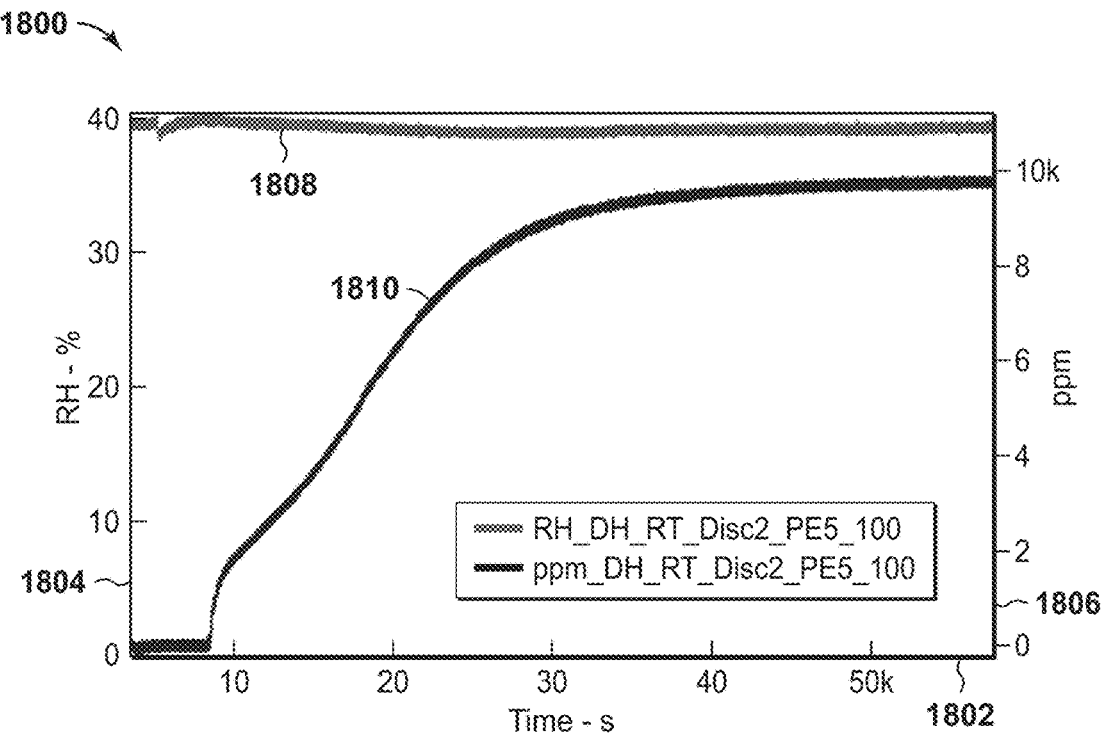
FIG. 18 is an exemplary diagram of water breakthrough in accordance with an embodiment of the present techniques.

The water uptake testing may be used to generate qualitative results of water breakthrough on a self-supporting structure monolith disks. FIG. 18 is an exemplary diagram 1800 of water breakthrough in accordance with an embodiment of the present techniques. In the diagram 1800, the composition of the self-supporting structure monolith disks may include $5A/SiO_2$ in a ratio of 80:20 (w/w), wherein the $SiO_2$ are 25 nm and the composition include 5% polyethylene spheres. The water uptake testing may be performed after gas permeance testing. For example, a disk that was tested in a gas permeance test unit has approximately 1.943 grams mass with a composition of approximately 80:20 5A/$SiO_2$. In the diagram 1800, a first response 1808 of Helium and a second response 1810 of water ($H_2O$) are shown along a time axis 1802 in seconds (s), a relative humidity axis 1804 in percentage (%) and a concentration axis 1806 in parts per million (ppm). In this diagram 1800, the flow rate is about 90 sccm, 38% relative humidity (RH), and 0.00088 grams water per minute (g $H_2O$/min). The estimated breakthrough time for 15% uptake capacity is about 15,311 seconds. The response 1810 has an initial sharp, vertical breakthrough portion, which is followed by a portion of the response 1810 flattens to a nearly horizontal line. As a result, the water uptake and breakthrough graph result indicates that the 5A crystals are functional after 5,000 psig compression.

Beneficially, the gas permeation results indicate that the method of using polyethylene spheres as one approach to pore engineering is effective. The use of polyethylene spheres to enhance gas transport in self-supported monolith disk compositions is also effective. In addition, pore engineering using macro-pore additives appears to provide greater advantage to compositions with smaller (25 nm) binder materials than in 100 nm binder materials at a similar w/w of binder material. These effects may include having a larger effect on average pore size of 25 nm binder materials because 25 nm $SiO_2$ particles are smaller than 100 nm $SiO_2$ particles and there are more 25 nm particles for same volume of material than 100 nm particles. Accordingly, the pore engineering may improve gas transport in self-supported structures, which may be specifically be used with polyethylene spheres, as an example approach to pore engineering.

Further enhancements in the self-supported structures may be used to enhance the fabrication processes and/or resulting structure. For example, the present techniques may include optimizing the order of components that are added, may include additives to enhance porosity and diffusional performance, and/or may include additives to enhance formulation processing (e.g., extruded monolith structures). As a first enhancement, the order of addition may be used to enhance the self-supported monolith. In this method, the pre-condition adsorbent may be filled to capacity with water. The order of addition may prevent fouling of adsorbent, which may include adding a sodium cation stabilizer in colloidal silica solutions. Also, the order of addition may involve preventing agglomeration and poor distribution of $SiO_2$ binder particles, as a result of adsorbing the $H_2O$ from the binder solution. As a second enhancement, the addition of macro pore additives to the composition. The addition of macro pore additives may improve macro porosity and reduce diffusional hindrance issues and may involve using polyethylene spheres (e.g., between 2 μm and 4 μm in diameter). As a third enhancement, the addition of plasticizing additive to the composition. The addition of plasticizing additive, such as clay materials, to the composition may be used to enhance material workability for processing by extrusion or intrusion or other methods. Also, the addition of plasticizing additive may improve structure defect issues that may result from drying and calcining.

Figure 19:
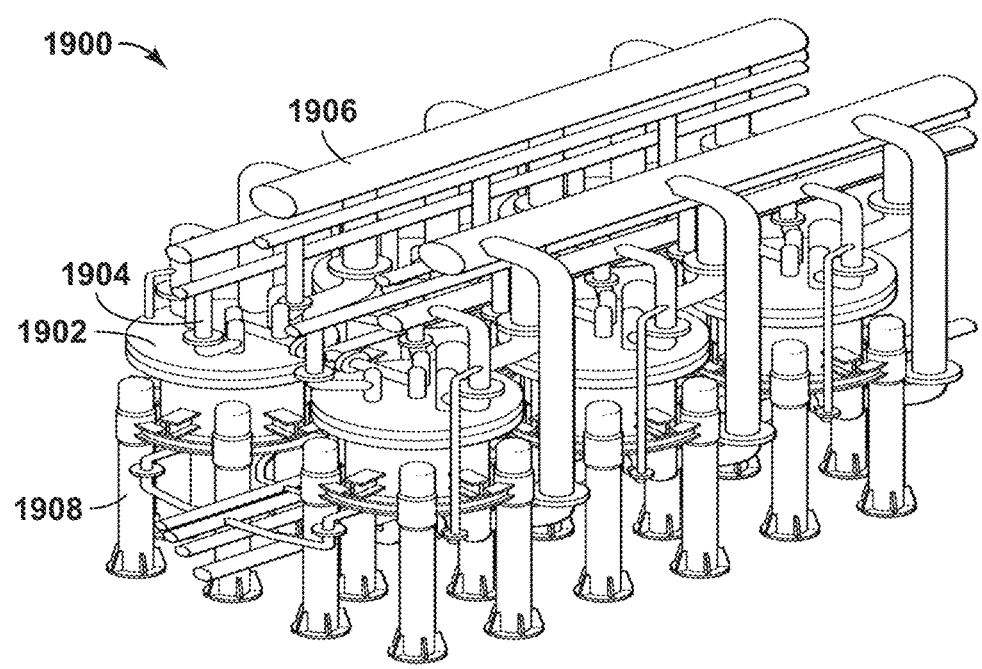
FIG. 19 is a three-dimensional diagram of the swing adsorption system with six adsorbent bed units and interconnecting piping in accordance with an embodiment of the present techniques.

By way of example, FIG. 19 is a three-dimensional diagram of the swing adsorption system 1900 having six adsorbent bed units and interconnecting piping. While this configuration is a specific example, the present techniques broadly relate to adsorbent bed units that can be deployed in a symmetrical orientation, or non-symmetrical orientation and/or combination of a plurality of hardware skids. Further, this specific configuration is for exemplary purposes as other configurations may include different numbers of adsorbent bed units. In this configuration, the adsorbent bed units may include self-supporting structures.

In this system, the adsorbent bed units, such as adsorbent bed unit 1902, may be configured for a cyclical swing adsorption method for removing contaminants from feed streams (e.g., fluids, gaseous or liquids). For example, the adsorbent bed unit 1902 may include various conduits (e.g., conduit 1904) for managing the flow of fluids through, to or from the adsorbent bed within the adsorbent bed unit 1902. These conduits from the adsorbent bed units 1902 may be coupled to a manifold (e.g., manifold 1906) to distribute the flow of the stream to, from or between components. The adsorbent bed within an adsorbent bed unit may separate one or more contaminants from the feed stream to form a product stream. As may be appreciated, the adsorbent bed units may include other conduits to control other fluid steams as part of the process, such as purge streams, depressurizations streams, and the like. Further, the adsorbent bed unit may also include one or more equalization vessels, such as equalization vessel 1908, which are dedicated to the adsorbent bed unit and may be dedicated to one or more step in the swing adsorption process.

In certain configurations, the self-supporting structure may be utilized in an adsorbent bed unit that includes a housing, which may include a head portion and other body portions, that forms a substantially gas impermeable partition. The housing may include the self-supporting structure (e.g., formed as an adsorbent bed) disposed within the housing and a plurality of valves (e.g., poppet valves) providing fluid flow passages through openings in the housing between the interior region of the housing and locations external to the interior region of the housing. Each of the poppet valves may include a disk element that is seatable within the head or a disk element that is seatable within a separate valve seat inserted within the head (not shown). The configuration of the poppet valves may be any variety of valve patterns or configuration of types of poppet valves. As an example, the adsorbent bed unit may include one or more poppet valves, each in flow communication with a different conduit associated with different streams. The poppet valves may provide fluid communication between the adsorbent bed and one of the respective conduits, manifolds or headers. The term "in direct flow communication" or "in direct fluid communication" means in direct flow communication without intervening valves or other closure means for obstructing flow. As may be appreciated, other variations may also be envisioned within the scope of the present techniques.

The adsorbent bed comprises adsorbent material formed into the self-supporting structure, which is capable of adsorbing one or more components from the feed stream. Such adsorbent materials are selected to be durable against the physical and chemical conditions within the adsorbent bed unit and can include metallic, ceramic, or other materials, depending on the adsorption process.

In certain configurations, the swing adsorption system, which includes the active material, may process a feed stream that predominately comprises hydrocarbons along with one or more contaminants. For example, the feed stream may be a hydrocarbon containing stream having greater than one volume percent hydrocarbons based on the total volume of the feed stream. Further, the feed stream may include hydrocarbons along with $H_2O$, $H_2S$, and $CO_2$. By way of example, the stream may include $H_2O$ as one of the one or more contaminants and the gaseous feed stream may comprise $H_2O$ in the range of 50 parts per million (ppm) molar to 1,500 ppm molar; or in the range of 500 ppm to 1,500 ppm molar. Moreover, the feed stream may include hydrocarbons and $H_2O$, wherein the $H_2O$ is one of the one or more contaminants and the feed stream comprises $H_2O$ in the range of two ppm molar to saturation levels in the feed stream.

In addition, the present techniques may provide an adsorption system that utilizes a rapid cycle swing adsorption method to separate acid gas contaminants from feed streams, such as acid gas from hydrocarbon streams. Acid gas removal technology may be useful for gas reserves exhibit higher concentrations of acid gas (e.g., sour gas resources). Hydrocarbon feed streams vary widely in amount of acid gas, such as from several parts per million acid gas to 90 volume percent (vol. %) acid gas. Non-limiting examples of acid gas concentrations from exemplary gas reserves include concentrations of at least: (a) 1 vol. % $H_2S$, 5 vol. % $CO_2$, (b) 1 vol. % $H_2S$, 15 vol. % $CO_2$, (c) 1 vol. % $H_2S$, 60 vol. % $CO_2$, (d) 15 vol. % $H_2S$, 15 vol. % $CO_2$, and (e) 15 vol. % $H_2S$, 30 vol. % $CO_2$. Accordingly, the present techniques may include equipment to remove various contaminants, such as $H_2S$ and $CO_2$ to desired levels. In particular, the $H_2S$ may be lowered to levels less than 4 ppm, while the $CO_2$ may be lowered to levels less than 1.8 molar percent (%) or, preferably, less than 50 ppm. As a further example, the acid gas removal system may remove $CO_2$ to LNG specifications (e.g., less than or equal to 50 parts per million volume (ppmv) $CO_2$).

In certain configurations, the active material may be used in a rapid cycle swing adsorption method, such as a rapid cycle PSA process, to remove moisture from the feed stream. The specific level may be related to dew point of desired output product (e.g., the water content should be lower than the water content required to obtain a dew point below the lowest temperature of the stream in subsequent process and is related to the feed pressure). As a first approximation, and not accounting for fugacity corrections as a function of pressure, the water concentration in ppm that yields a certain dew point varies inversely with the pressure. For example, the output stream from the adsorbent bed may be configured to be the cryogenic processing feed stream, which satisfies the cryogenic processing specifications (e.g., approximately −150° F. (−101.1° C.) dew point for NGL processes or approximately −60° F. (−51.1° C.) for Controlled Freeze Zone (CFZ) processes. The cryogenic processing feed stream specification may include a water content in the stream (e.g., output stream from the adsorbent bed or feed stream to the to be cryogenic processing) to be in the range between 0.0 ppm and 10 ppm, in the range between 0.0 ppm and 5.0 ppm, in the range between 0.0 ppm and 2.0 ppm, or in the range between 0.0 ppm and 1.0 ppm. The resulting output stream from the adsorbent beds during the purge step may include a water content in the stream to be in the range between 0.0 ppm and 7 pounds per standard cubic feet (lb/MSCF).

In one or more embodiments, the present techniques can be used for any type of swing adsorption method. Non-limiting swing adsorption methods for which the present techniques may include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these methods, such as pressure and/or temperature swing adsorption. Exemplary kinetic swing adsorption methods are described in U.S. Patent Application Publication Nos. 2008/0282892, 2008/0282887, 2008/ 0282886, 2008/0282885, 2008/0282884 and 2014/0013955 and U.S. Ser. Nos. 15/233,617, 15/233,623, 15/233,631 and 15/233,640, which are each herein incorporated by reference in their entirety. However, rapid cycle may be preferred to process the stream. However, the self-supporting structures may be preferably utilized with rapid cycle swing adsorption methods.

Further, in certain configurations of the system, the present techniques may include a specific process flow to remove contaminants, such as water ($H_2O$) or acid gas, in the swing adsorption system. For example, the method may include an adsorbent step and a regeneration step, which form the cycle. The adsorbent step may include passing a feed stream at a feed pressure and feed temperature through an adsorbent bed unit having an active material structure to separate one or more contaminants from the feed stream to form a product stream. The feed stream may be passed through the adsorbent bed in a forward direction (e.g., from the feed end of the adsorbent bed to the product end of the adsorbent bed). Then, the flow of the feed stream may be interrupted for a regeneration step. The regeneration step may include one or more depressurization steps, one or more purge steps and/or one or more re-pressurization steps. The depressurization steps may include reducing the pressure of the adsorbent bed unit by a predetermined amount for each successive depressurization step, which may be a single step and/or may be a blowdown step. The depressurization step may be provided in a forward direction or may preferably be provided in a countercurrent direction (e.g., from the product end of the adsorbent bed to the feed end of the adsorbent bed). The purge step may include passing a purge stream into the adsorbent bed unit, which may be a once through purge step and the purge stream may be provided in countercurrent flow relative to the feed stream. The purge product stream from the purge step may be conducted away and recycled to another system or in the system. Then, the one or more re-pressurization steps may be performed, wherein the pressure within the adsorbent bed unit is increased with each re-pressurization step by a predetermined amount with each successive re-pressurization step. Then, the cycle may be repeated for additional feed streams and/or the cycle may be adjusted to perform a different cycle for a second configuration. The cycle duration may be for a period greater than 1 second and less than 600 seconds, for a period greater than 2 second and less than 300 seconds, for a period greater than 2 second and less than 200 seconds, or for a period greater than 2 second and less than 90 seconds.

Also, the present techniques may be integrated into a various configurations, which may include a variety of compositions for the streams. Adsorptive separation methods, apparatus, and systems, as described above, are useful for development and production of hydrocarbons, such as gas and oil processing. Particularly, the provided methods, apparatus, and systems are useful for the rapid, large scale, efficient separation of a variety of target gases from gas mixtures. In particular, the methods, apparatus, and systems may be used to prepare feed products (e.g., natural gas products) by removing contaminants and heavy hydrocarbons (e.g., hydrocarbons having at least two carbon atoms). The provided methods, apparatus, and systems are useful for preparing gaseous feed streams for use in utilities, including separation applications. The separation applications may include dew point control; sweetening and/or detoxification; corrosion protection and/or control; dehydration; heating value; conditioning; and/or purification. Examples of utilities that utilize one or more separation applications include generation of fuel gas; seal gas; non-potable water; blanket gas; instrument and control gas; refrigerant; inert gas; and/or hydrocarbon recovery.

To provide fluid flow paths through the self-supporting structure in an adsorbent bed unit, valve assemblies may include poppet valves, which each may include a disk element connected to a stem element which can be positioned within a bushing or valve guide. The stem element may be connected to an actuating means, such as actuating means, which is configured to have the respective valve impart linear motion to the respective stem. As may be appreciated, the actuating means may be operated independently for different steps in the method to activate a single valve or a single actuating means may be utilized to control two or more valves. Further, while the openings may be substantially similar in size, the openings and inlet valves for inlet manifolds may have a smaller diameter than those for outlet manifolds, given that the gas volumes passing through the inlets may tend to be lower than product volumes passing through the outlets. Further, while this configuration has valve assemblies, the number and operation of the valves may vary (e.g., the number of valves) based on the specific cycle being performed.

In one or more embodiments, the rapid cycle swing adsorption method that utilize the self-supporting structures in the present techniques may include rapid cycle temperature swing adsorption (RCTSA) and/or rapid cycle pressure swing adsorption (RCPSA). For example, the total cycle times may be less than 600 seconds, less than 300 seconds, preferably less than 200 seconds, more preferably less than 90 seconds, and even more preferably less than 60 seconds.

In view of the many possible embodiments to which the principles of the disclosed invention may be applied, it should be recognized that the illustrative embodiments are only preferred examples of the invention and should not be taken as limiting the scope of the invention.

What is claimed is:

1. A processing unit comprising:
    a housing forming an interior region;
    a self-supporting structure disposed within the interior region, wherein the self-supporting structure has greater than 50% by weight of an active material in the self-supporting structure, and wherein the self-supporting structure is an open-celled structure configured to provide one or more defined channels for fluid flow paths through the self-supporting structure, and wherein the self-supporting structure consists essentially of the active material and a silica binder material; and
    a plurality of valves secured to the housing, wherein each of the plurality of valves is configured to control fluid flow along a flow path extending between the self-supporting structure and a location external to the housing;
    wherein the self-supporting structure is formed by:
        creating a template for a self-supporting structure;
        disposing a mixture within the template, wherein the mixture has greater than 50% by weight of the active material in the self-supporting structure and the silica binder material;
        curing the combination of the template and the mixture to form a self-supporting structure that is maintains a solid form; and
        removing the template from the self-supporting structure, wherein the one or more defined channels are based on the template.

2. The processing unit of claim 1, wherein the processing unit is a cyclical swing adsorbent bed unit configured to remove contaminants from a gaseous feed stream that passes through the one or more defined channels in the self-supporting structure.

3. The processing unit of claim 1, wherein the self-supporting structure has greater than 60% by weight of the active material in the self-supporting structure.

4. The processing unit of claim 1, wherein the self-supporting structure has greater than 70% by weight of the active material in the self-supporting structure.

5. The processing unit of claim 1, wherein the processing unit further comprises a flow distributor disposed between the self-supporting structure and the plurality of valves.

6. The processing unit of claim 1, wherein the housing is configured to maintain a pressure from 5 pounds per square inch absolute (psia) and 1,400 psia.

7. The processing unit of claim 1, wherein the self-supporting structure has a low thermal mass.

8. The processing unit of claim 1, wherein the one or more defined channels comprise two or more channels that are substantially parallel.

9. The processing unit of claim 1, wherein the self-supporting structure has a plurality of pores formed in the active material by removing a plurality of polyethylene spheres from the active material to form the plurality of pores.

* * * * *